(12) United States Patent
Wang et al.

(10) Patent No.: US 7,722,894 B2
(45) Date of Patent: May 25, 2010

(54) BIODEGRADABLE POLYMER

(75) Inventors: Yadong Wang, Somerville, MA (US); Guillermo Ameer, Chicago, IL (US); Robert Langer, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 195 days.

(21) Appl. No.: 10/277,562

(22) Filed: Oct. 21, 2002

(65) Prior Publication Data

US 2003/0118692 A1 Jun. 26, 2003

Related U.S. Application Data

(60) Provisional application No. 60/340,432, filed on Oct. 22, 2001, provisional application No. 60/336,545, filed on Oct. 23, 2001.

(51) Int. Cl.
*A61F 13/00* (2006.01)
(52) U.S. Cl. .................. 424/422; 528/300
(58) Field of Classification Search .............. 424/422
See application file for complete search history.

(56) References Cited

U.S. PATENT DOCUMENTS

| | | | |
|---|---|---|---|
| 1,489,744 A | 4/1924 | Downs et al. | |
| 1,779,367 A * | 10/1930 | Bruson | 528/301 |
| 3,772,064 A | 11/1973 | Mendelsohn et al. | 117/122 P |
| 4,048,256 A | 9/1977 | Casey et al. | 260/860 |
| 4,064,086 A * | 12/1977 | Cowsar et al. | 524/601 |
| 4,177,596 A | 12/1979 | Dillow | 43/36 |
| 4,205,399 A | 6/1980 | Shalaby et al. | 3/1 |
| 4,275,169 A * | 6/1981 | Rudner et al. | 521/99 |
| 4,343,048 A | 8/1982 | Ross et al. | 3/1.5 |
| 4,638,045 A | 1/1987 | Kohn et al. | |
| 4,806,621 A | 2/1989 | Kohn et al. | |
| 4,946,929 A | 8/1990 | D'Amore et al. | |
| 5,010,167 A | 4/1991 | Ron et al. | |
| 5,019,379 A | 5/1991 | Domb et al. | |
| 5,116,937 A | 5/1992 | Greene | 528/272 |
| 5,166,310 A | 11/1992 | Rooney | |
| 5,286,763 A | 2/1994 | Gerhart et al. | 514/772.4 |
| 5,295,985 A | 3/1994 | Romesser et al. | 604/358 |
| 5,399,665 A | 3/1995 | Barrera et al. | 528/354 |
| 5,489,298 A | 2/1996 | Love et al. | 623/2 |
| 5,505,808 A * | 4/1996 | Hallman et al. | 156/233 |
| 5,512,600 A | 4/1996 | Mikos et al. | |
| 5,514,378 A | 5/1996 | Mikos et al. | |
| 5,525,646 A | 6/1996 | Lundgren et al. | 523/105 |
| 5,545,212 A | 8/1996 | Wakabayashi et al. | 623/1 |
| 5,696,175 A | 12/1997 | Mikos et al. | |
| 5,716,404 A | 2/1998 | Vacanti et al. | |
| 5,736,372 A | 4/1998 | Vacanti et al. | |
| 5,770,417 A | 6/1998 | Vacanti et al. | |
| 5,804,178 A | 9/1998 | Vacanti et al. | |
| 5,837,752 A | 11/1998 | Shastri et al. | |
| 5,902,599 A | 5/1999 | Anseth et al. | |
| 6,017,566 A | 1/2000 | Bunczek et al. | 426/3 |
| 6,095,148 A | 8/2000 | Shastri et al. | |
| 6,123,727 A | 9/2000 | Vacanti et al. | |
| 6,160,084 A | 12/2000 | Langer et al. | 528/272 |
| 6,376,742 B1 * | 4/2002 | Zdrahala et al. | 623/11.11 |
| 6,444,782 B1 * | 9/2002 | Hamlin | 528/300 |
| 6,818,018 B1 * | 11/2004 | Sawhney | 623/11.11 |
| 2002/0049183 A1 * | 4/2002 | Yedgar et al. | 514/54 |
| 2003/0003125 A1 * | 1/2003 | Nathan et al. | 424/408 |
| 2003/0086985 A1 * | 5/2003 | Gupta et al. | 424/725 |
| 2003/0185870 A1 * | 10/2003 | Grinstaff et al. | 424/423 |
| 2004/0006153 A1 * | 1/2004 | Seppala et al. | 523/113 |
| 2004/0086479 A1 * | 5/2004 | Grinstaff et al. | 424/78.17 |
| 2004/0131582 A1 * | 7/2004 | Grinstaff et al. | 424/78.3 |
| 2005/0019747 A1 | 1/2005 | Anderson | |
| 2005/0048121 A1 | 3/2005 | Kanamathareddy | |
| 2005/0063939 A1 | 3/2005 | Ameer | |
| 2009/0011486 A1 | 1/2009 | Bettinger et al. | |
| 2009/0047256 A1 | 2/2009 | Bettinger et al. | |

FOREIGN PATENT DOCUMENTS

| | | |
|---|---|---|
| DE | 31 23 465 A1 | 12/1982 |
| EP | 0 246 341 | 11/1987 |
| EP | 0 427 496 | 5/1991 |
| EP | 0 509 814 | 10/1992 |
| EP | 0 711 506 | 5/1996 |
| EP | 0 768 329 | 4/1997 |
| EP | 0 807 653 | 11/1997 |
| EP | 0 934 918 | 8/1999 |

(Continued)

OTHER PUBLICATIONS

Notification of Transmittal of the International Search Report for Corresponding PCT Application PCT/US02/33787.

(Continued)

*Primary Examiner*—Robert A Wax
*Assistant Examiner*—Bethany Barham
(74) *Attorney, Agent, or Firm*—Pabst Patent Group LLP

(57) ABSTRACT

A biodegradable polymer comprising a condensation polymer of glycerol and a diacid. The polymer may be adapted for use as a tissue engineering construct. For example, it may be seeded with cells or molecules may be attached to it to modify the metabolism and proliferation of cells or to modify the degradation rate and/or mechanism of the polymer. The polymer may also be exploited in a variety of medical and non-medical applications.

54 Claims, 25 Drawing Sheets
(12 of 25 Drawing Sheet(s) Filed in Color)

FOREIGN PATENT DOCUMENTS

| | | |
|---|---|---|
| EP | 1 038 538 | 9/2000 |
| JP | 57-170259 | 10/1982 |
| JP | 5-140870 | 6/1993 |
| WO | WO 98/30617 | 7/1998 |
| WO | WO 98/58010 * | 12/1998 |
| WO | WO 00/35297 | 6/2000 |
| WO | WO 01/76554 A2 | 10/2001 |

OTHER PUBLICATIONS

J.H. de Groot, et al., "Use of porous polyurethanes for meniscal reconstruction and meniscal prostheses", *Biomaterials* 17 163-173 (1996).

James M. Anderson, et al., "Biodegradation and biocompatibility of PLA and PLGA microspheres", *Advanced Drug Delivery Reviews* 28: 5-24 (1997).

C.P. Semba, et al., "Acute rupture of the descending thoracic oarta: repair with use of endovascular stent-grafts", *Journal of Vascular and Interventional Radiology* 8: 337-342, (1997) (abstract only).

Jinming Gao, et al., "Surface hydrolysis of poly(glycolic acid) meshes increases the seeding density of vascular smooth muscle cells", *Journal of Biomedical Materials Research* 42: 417-424, (1998).

Malekzadeh Reza, et al., "Isolation of human osteoblast-like cells and in vitro amplication for tissue engineering", *Journal of Periodontology* 69: 1256-1262 (1998) (abstract only).

Minoru Nagata, et al., "Synthesis, Characterization, and Enzymatic Degradation of Network Aliphatic Copolyesters", *Journal of Polymer Science: Part A: Polymer Chemistry* 37: 2005-2011 (1999).

Robert Langer, "Biomaterials: Status, Challenges, and Perspectives", *AIChE Journal* 46, 1286-1289 (2000).

Nicholas A. Peppas, et al., "New Challenges in Biomaterials", *Science* 263, 1715-1720 (1994).

L. Calandrelli, et al., "Preparation and characterisation of composites based on biodegradable polymers for 'in vivo' application", *Polymer* 41, 8027-8033 (2000).

Christine C. Dupont-Gillain, et al., "Collagen adsorption on poly(methyl methacrylate): net-like structure formtaion upon drying", *Polymer Int* 48, 271-276 (1999).

J.L. Wang, et al., "Failure criterion of collagen fiber: Viscoelastic behavior simulated by using load control data", *Theoretical and Applied Fracture Mechanics* 27 1-12 (1997).

Peter Fratzl, et al., "Fibrillar Structure and Mechanical Properties of Collagen", *Journal of Structural Biology* 122, 119-122 (1997).

Robson F. Storey, et al., "Methacrylate-endcapped poly(d,l-lactide-co-trimethylene carbonate) oligomers. Network formation by thermal free-radical curing", *Polymer* 38, 6295-6301 (1997).

M. van der Elst, et al., "Bone tissue response to biodegradable polymers used for intra medullary fracture fixation: A long-term in vivo study in sheep femora", *Biomaterials* 20, 121-128 (1999).

Guoying Liu, et al., "Mechanisms for the Transport of $\alpha$, $\omega$-Dicarboxylates through the Mitochondrial Inner Membrane", *The Journal of Biological Chemistry* 271, 25338-25344 (1996).

Kuen Yong Lee, et al., "Controlling Mechanical and Swelling Properties of Alginate Hydrogels Independently by Cross-Linker Type and Cross-Linking Density", *Macromolecules* 33, 4291-4294 (2000).

J.A. Cadée, et al., "A comparative biocompatibility study of microspheres based on crosslinked dextran or poly(lactic-co-glycolic) acid after subcutaneous injection in rats", *J Biomed Mater Res* 56, 600-609 (2001).

James M. Anderson, "In vivo Biocompatibility of Implantable Delivery Systems and Biomaterials", *Eur. J. Pharm. Biopharm.* 40, 1-8 (1994).

John C. Middleton, et al., "Synthetic biodegradable polymers as orthopedic devices", *Biomaterials* 21, 2335-2346 (2000).

Klaus Misof, et al., "A New Molecular Model for Collagen Elasticity Based on Synchrotron X-Ray Scattering Evidence", *Biophysical Journal* 72, 1376-1381 (1997).

J. Tamada, et al., "Review the development of polyanhydrides for drug delivery applications", *J. Biomater Sci. Polymer Edn.* 3, 315-353 (1992).

Jennifer L. West, et al., "Polymeric Biomaterials with Degradation Sites for Proteases Involved in Cell Migration", *Macromolecules* 32, 241-244 (1999).

André Laschewsky, et al., "Tailoring of Stimuli-Responsive Water Soluble Acrylamide and Methacrylamide Polymers", *Macromol. Chem. Phys.* 202, 276-286 (2001).

K.N. Jayachandran, et al., "Synthesis of dense brush polymers with cleavable grafts", *European Polymer Journal* 36, 743-749 (2000).

Kristi S. Anseth, et al., "Photopolymerizable degradable polyanhydrides with osteocompatibility", *Nature Biotechnology* 17, 156-159 (1999).

A. Helminen, et al., "Biodegradable crosslinked polymers based on triethoxysilane terminated polylactice oligomers", *Polymer* 42, 3345-3353 (2001).

Denise Barera, et al., "Synthesis and RGD Peptide Modification of a New Biodegradable Copolymer: Poly(lactic acid c-lysine)", *JACS* 115, 11010-11011 (1993).

Kiyotsukuri, et al., "Network polyester films from glycerol and dicarboxylic acids", *Polymer International*, 33(1):1-8 (1994).

Rosenblatt, et al., "Synthesis of a fragment of human parathyroid hormore, hPTH-(44-68)", *J. Med. Chem.*, 20(11):1452-6 (1977).

Wang, et al., "A tough biodegradable elastomer", *Nat. Biotechnol.*, 20(6):602-6 (2002).

* cited by examiner

Elastin

Elastin Chain

Bio-rubber

Bio-rubber Chain x: other amino acid side chain

BIODEGRADABLE POLYMER

PRIORITY CLAIM

This application claims the priority of Provisional Patent Applications Nos. 60/340,432, filed Oct. 22, 2001, and 60/336,545, filed Oct. 23, 2001, the entire contents of which are incorporated by reference herein.

GOVERNMENT FUNDING

The work described herein was supported, in part, by a grant from the National Institutes of Health (#5-R01-HL60435-02). Accordingly, the Government may have certain rights in this invention.

BACKGROUND OF THE INVENTION

Biodegradable polymers have significant potential in various fields of medicine, such as tissue engineering, drug delivery, and in vivo sensing. Many biomedical devices are implanted in a mechanically dynamic environment in the body, which requires the implants to sustain and recover from various deformations without mechanical irritation of the surrounding tissue. In many cases, the matrices and scaffolds of these implants would ideally be made of biodegradable polymers that mimic the functions of extracellular matrix (ECM), a soft, tough and elastomeric proteinaceous network that provides mechanical stability and structural integrity to tissues and organs. Hence an elastomeric biodegradable polymer that readily recovers from relatively large deformations is advantageous for maintaining the implant's proper function (Peppas, N. A., et al., New Challenges In Biomaterials. *Science* 263: 1715-20, 1994; Langer, R., Biomaterials: Status, Challenges and Perspectives. *AIChE J.* 46: 1286-1289, 2000). However, most currently available biodegradable polymers are not elastomeric, and >95% of the revenue from these polymers is generated by bioabsorbable sutures. For example, PLGA has a modulus of 2 GPa and a maximum elongation of about 2-10%. In contrast, the modulus of collagen is 1.2 GPa, and the modulus of elastin is 410 kPa. Common biodegradable polymers often require surface modification for wettability and cell attachment (Gao, J., Niklason, et al., Surface Hydrolysis of Poly(glycolic acid) Meshes Increases the Seeding Density of Vascular Smooth Muscle Cells. *J. Biomed. Mater. Res.* 42: 417-424, 1998) and are subject to fibrous encapsulation (Anderson, J. M., et al., Biodegradation and Biocompatibility of PLA and PLGA Microspheres. *Adv. Drug Deliv. Rev.* 28: 5-24, 1997; Anderson, J. M., In vivo Biocompatibility of Implantable Delivery Systems and Biomaterials. *Eur. J Pharm. Biopharm.* 40: 1-8 1994).

SUMMARY OF THE INVENTION

In one aspect, the invention is a polymer comprising a biodegradable condensation polymer of glycerol and a diacid. The polymer has a tensile elastic modulus of 5 MPa or less. The polymer may be biocompatible, elastomeric, or both. The ratio of the glycerol to the diacid may be between 1 and 1.5. The diacid may be sebacic acid. Alternatively, the diacid may have fewer carbons, for example, between 3 and 9 carbon atoms. Longer diacids, having chains longer than 10, 15, 20, or 25 carbon atoms, may also be used. The diacid may include one or more double bonds, and aromatic group, an amine, a hydroxyl group, a halogen atom, an aliphatic side chain, or any combination of the above. The polymer may be crosslinked. The polymer may have a crosslink density of 40% or less, less than 30%, less than 20%, less than 20%, less than 5%, less than 1%, less than 0.5%, or less than 0.05%. The Young's modulus of the polymer may be less than 3 MPa, less than 1 MPa, less than 0.5 MPa, less than 0.1 MPa, or less than 0.01 MPa. The ultimate tensile strength of the polymer may be greater than 0.5 MPa. The polymer may have a maximum elongation greater than 250%. When the polymer is exposed to an aqueous environment, it may be characterized by surface erosion.

The polymer may further include a biomolecule, a hydrophilic group, a hydrophobic group, a non-protein organic group, an acid, a small molecule, a bioactive agent, or any combination of the above. For example, the biomolecule may be a growth factor, cell adhesion sequence, polynucleotide, polysaccharide, polypeptide, extracellular matrix component, or any combination of these. These molecular groups may be linked to the polymer through a covalent bond or a non-covalent bond, e.g., a hydrogen bond, an electrostatic interaction, a hydrophobic interaction, or a van der Waals interaction.

The polymer may be seeded with cells, for example, connective tissue cells, organ cells, muscle cells, nerve cells, or some combination of these. In another embodiment, the polymer may further comprise a second polymer as a mixture or adduct. The second polymer may be biodegradable or non-biodegradable, and it may be biocompatible.

A chromophore may be covalently linked to the polymer. A receptor may be covalently linked to the chromophore or interposed between the chromophore and the polymer. The polymer may be porous and may include a porogen. The shape of the polymer may be particulate, a tube, a sphere, a strand, a coiled strand, a capillary network, a film, a fiber, a mesh, or a sheet. In another aspect, the invention is a polymer comprising a biodegradable, elastomeric condensation polymer of glycerol and a diacid. In another embodiment, the invention is a polymer comprising a biodegradable condensation polymer of glycerol and a diacid, wherein the polymer is adapted and constructed for use as an adhesive.

In another aspect, the invention is a drug delivery device comprising the glycerol-diacid co-polymer and a small molecule, a bioactive molecule, or both. The small or bioactive molecule may be covalently or non-covalently attached to the polymer. The drug delivery device may be adapted to be implanted in the abdominal region of a patient, and the small or bioactive molecule may be an anti-inflammatory agent.

In another aspect, the invention is a cardiac stent comprising an expandable metal mesh and the glycerol-diacid co-polymer or a mixture or adduct of the co-polymer and a second biocompatible polymer. Both the coated stent and the polymeric stent may include a small molecule or a bioactive agent disposed within the polymer, for example, covalently or non-covalently linked to the polymer. The second biocompatible polymer may be biodegradable or non-biodegradable.

In another aspect, the invention is an absorbent garment including a liquid pervious topsheet, a backsheet comprising the glycerol-diacid co-polymer, and a liquid absorbent cord disposed between the topsheet and the backsheet. The polymer may be degradable in a landfill, and the garment may be a diaper, incontinence protector, sanitary napkin, panty liner, or surgical dressing.

In another aspect, the invention is a chewing gum including the glycerol-diacid co-polymer and a flavoring agent, colorant, or both. The chewing gum may further include a small molecule, a nutrient, or both that may be covalently or non-covalently attached to the polymer.

In another embodiment, the invention is an inflatable balloon that includes the glycerol-diacid co-polymer and that is degradable in an outdoor environment. In another embodiment, the invention is a fishing lure or a fishing fly that includes the glycerol-diacid co-polymer and a hook; the polymer degrades after exposure to an aqueous environment. In another embodiment, the invention is a disposable bag including the glycerol-diacid co-polymer. The disposable bag degrades in a landfill.

In another aspect, the invention is a tissue engineering construct including an elastomeric biodegradable condensation polymer of glycerol and a diacid. The ratio of the glycerol to the diacid may be between 1 and 1.5. The diacid may be sebacic acid. Alternatively, the diacid may have carbon chains having fewer or more carbon atoms, for example, between 3 and 9 carbons, greater than 10 carbons, greater than 15 carbons, greater than 20 carbons, or greater than 25 carbons.

The polymer may have a crosslink density of 40% or less, less than 30%, less than 20%, less than 20%, or less than 5%. The Young's modulus of the polymer may be less than 5 MPa, 3 MPa, less than 1 MPa, less than 0.5 MPa, less than 0.1 MPa, or less than 0.01 MPa. The ultimate tensile strength of the polymer may be greater than 0.5 MPa. The polymer may have a maximum elongation greater than 250%. When the polymer is exposed to an physiological environment, it may be characterized by surface erosion.

The tissue may be selected from muscle tissue, connective tissue, nerve tissue, organ tissue, epithelial tissue, or any combination of these. For example, the tissue may be skin, lung, cardiac muscle, skeletal muscle, smooth muscle, heart valve, bone, nerve, kidney, bladder, liver, tendon, ligaments, or pancreas tissue.

The construct may be seeded with connective tissue cells, organ cells, muscle cells, nerve cells, or some combination of these. For example, the cells may be tenocytes, fibroblasts, ligament cells, endothelial cells, lung cells, epithelial cells, smooth muscle cells, cardiac muscle cells, skeletal muscle cells, islet cells, nerve cells, hepatocytes, kidney cells, bladder cells, urothelial cells, chondrocytes, or bone-forming cells.

The shape of the polymer may be particulate, a tube, a sphere, a strand, a coiled strand, a capillary network, a film, a fiber, a mesh, or a sheet. The polymer may be porous, and the tissue engineering construct may include a porogen.

The construct may further include a biomolecule, a hydrophilic group, a hydrophobic group, a non-protein organic group, an acid, a small molecule, a bioactive molecule, or some combination of these. The construct may further include a second biocompatible polymer that may form a mixture or adduct with the biocompatible condensation polymer. The second biocompatible polymer may be biodegradable or non-biodegradable.

In another aspect, the invention is a method of producing a polymer. The invention includes the steps of combining equal molar amounts of glycerol and a diacid to form a mixture, holding the mixture at a temperature of 120° C. in an inert atmosphere at a pressure of 1 Torr for 24 hours, and holding the mixture at a temperature of 120° C. and a pressure of 40 m Torr until the mixture forms a polymer having a predetermined cross-link density. The mixture may be held at 40 m Torr for 24 hours or 48 hours. The step of combining may further include adding a porogen, e.g., azodicarboimide, an alkali halide salt, or a water-soluble salt, to the mixture. The polymerized mixture may be soaked in water to leach out the porogen. The method may further include modifying hydroxyl groups on the polymer with one or more of a biomolecule, a hydrophilic group, a hydrophobic group, a non-protein organic group, an acid, a small molecule, or a bioactive agent.

The method may further include the steps of providing a substrate having a predetermined pattern of grooves and channels and a sacrificial coating of a water-soluble material, casting the mixture over the substrate after the step of combining, and, after the mixture has the predetermined cross-link density, dissolving the sacrificial layer to free the polymer from the substrate. The polymer has a release pattern corresponding to the predetermined pattern. The release pattern in the polymer may be covered to form covered channels. For example, the cover may include an elastomeric copolymer of glycerol and a diacid. The step of covering may include providing a cover, disposing a partially polymerized equimolar mixture of glycerol and a diacid between the cover and the polymer, and cross-linking the equimolar mixture. A cover may also be provided by combining equal molar amounts of glycerol and a diacid to form a mixture, holding the mixture at a temperature of 120° C. in an inert atmosphere at a pressure of 1 Torr for 24 hours, forming the mixture into a sheet, disposing the sheet over the relief pattern in the polymer, and holding the mixture at a temperature of 120° C. in an inert atmosphere at a pressure of 1 Torr until the sheet has a predetermined cross-link density. The mixture may be formed into a sheet before or after the initial holding step.

Definitions

"Biomolecules": The term "biomolecules", as used herein, refers to molecules (e.g., proteins, amino acids, peptides, polynucleotides, nucleotides, carbohydrates, sugars, lipids, nucleoproteins, glycoproteins, lipoproteins, steroids, etc.) whether naturally-occurring or artificially created (e.g., by synthetic or recombinant methods) that are commonly found in cells and tissues. Specific classes of biomolecules include, but are not limited to, enzymes, receptors, neurotransmitters, hormones, cytokines, cell response modifiers such as growth factors and chemotactic factors, antibodies, vaccines, haptens, toxins, interferons, ribozymes, anti-sense agents, plasmids, DNA, and RNA.

"Biocompatible": The term "biocompatible", as used herein is intended to describe materials that do not elicit a substantial detrimental response in vivo.

"Biodegradable": As used herein, "biodegradable" polymers are polymers that degrade fully (i.e., down to monomeric species) under physiological or endosomal conditions. In preferred embodiments, the polymers and polymer biodegradation byproducts are biocompatible. Biodegradable polymers are not necessarily hydrolytically degradable and may require enzymatic action to fully degrade.

"Elastomer": As used herein, an elastomer is a macromolecular material can return rapidly to the approximate shape from which it has been substantially distorted by a weak stress. Rubber is the most common elastomer.

"Endosomal conditions": The phrase "endosomal conditions", as used herein, relates to the range of chemical (e.g., pH, ionic strength) and biochemical (e.g., enzyme concentrations) conditions likely to be encountered within endosomal vesicles. For most endosomal vesicles, the endosomal pH ranges from about 5.0 to 6.5.

"Physiological conditions": The phrase "physiological conditions", as used herein, relates to the range of chemical (e.g., pH, ionic strength) and biochemical (e.g., enzyme concentrations) conditions likely to be encountered in the intracellular and extracellular fluids of tissues. For most tissues, the physiological pH ranges from about 7.0 to 7.4.

"Polynucleotide", "nucleic acid", or "oligonucleotide": The terms "polynucleotide", "nucleic acid", or "oligonucleotide" refer to a polymer of nucleotides. The terms "polynucleotide", "nucleic acid", and "oligonucleotide", may be used interchangeably. Typically, a polynucleotide comprises at least three nucleotides. DNAs and RNAs are polynucleotides. The polymer may include natural nucleosides (i.e., adenosine, thymidine, guanosine, cytidine, uridine, deoxyadenosine, deoxythymidine, deoxyguanosine, and deoxycytidine), nucleoside analogs (e.g., 2-aminoadenosine, 2-thiothymidine, inosine, pyrrolo-pyrimidine, 3-methyl adenosine, C5-propynylcytidine, C5-propynyluridine, C5-bromouridine, C5-fluorouridine, C5-iodouridine, C5-methylcytidine, 7-deazaadenosine, 7-deazaguanosine, 8-oxoadenosine, 8-oxoguanosine, O(6)-methylguanine, and 2-thiocytidine), chemically modified bases, biologically modified bases (e.g., methylated bases), intercalated bases, modified sugars (e.g., 2'-fluororibose, ribose, 2'-deoxyribose, arabinose, and hexose), or modified phosphate groups (e.g., phosphorothioates and 5'-N-phosphoramidite linkages).

"Polypeptide", "peptide", or "protein": According to the present invention, a "polypeptide", "peptide", or "protein" comprises a string of at least three amino acids linked together by peptide bonds. The terms "polypeptide", "peptide", and "protein", may be used interchangeably. Peptide may refer to an individual peptide or a collection of peptides. Inventive peptides preferably contain only natural amino acids, although non-natural amino acids (i.e., compounds that do not occur in nature but that can be incorporated into a polypeptide chain; see, for example, http://www.cco.caltech.edu/~dadgrp/Unnatstruct.gif, which displays structures of non-natural amino acids that have been successfully incorporated into functional ion channels) and/or amino acid analogs as are known in the art may alternatively be employed. Also, one or more of the amino acids in an inventive peptide may be modified, for example, by the addition of a chemical entity such as a carbohydrate group, a phosphate group, a farnesyl group, an isofarnesyl group, a fatty acid group, a linker for conjugation, functionalization, or other modification, etc. In a preferred embodiment, the modifications of the peptide lead to a more stable peptide (e.g., greater half-life in vivo). These modifications may include cyclization of the peptide, the incorporation of D-amino acids, etc. None of the modifications should substantially interfere with the desired biological activity of the peptide.

"Polysaccharide", "carbohydrate" or "oligosaccharide": The terms "polysaccharide", "carbohydrate", or "oligosaccharide" refer to a polymer of sugars. The terms "polysaccharide", "carbohydrate", and "oligosaccharide", may be used interchangeably. Typically, a polysaccharide comprises at least three sugars. The polymer may include natural sugars (e.g., glucose, fructose, galactose, mannose, arabinose, ribose, and xylose) and/or modified sugars (e.g., 2'-fluororibose, 2'-deoxyribose, and hexose).

"Small molecule": As used herein, the term "small molecule" is used to refer to molecules, whether naturally-occurring or artificially created (e.g., via chemical synthesis), that have a relatively low molecular weight. Typically, small molecules are monomeric and have a molecular weight of less than about 1500 g/mol. Preferred small molecules are biologically active in that they produce a local or systemic effect in animals, preferably mammals, more preferably humans. In certain preferred embodiments, the small molecule is a drug. Preferably, though not necessarily, the drug is one that has already been deemed safe and effective for use by the appropriate governmental agency or body. For example, drugs for human use listed by the FDA under 21 C.F.R. §§330.5, 331 through 361, and 440 through 460; drugs for veterinary use listed by the FDA under 21 C.F.R. §§500 through 589, incorporated herein by reference, are all considered acceptable for use in accordance with the present invention.

"Bioactive agents": As used herein, "bioactive agents" is used to refer to compounds or entities that alter, inhibit, activate, or otherwise affect biological or chemical events. For example, bioactive agents may include, but are not limited to, anti-AIDS substances, anti-cancer substances, antibiotics, immunosuppressants, anti-viral substances, enzyme inhibitors, neurotoxins, opioids, hypnotics, anti-histamines, lubricants, tranquilizers, anti-convulsants, muscle relaxants and anti-Parkinson substances, anti-spasmodics and muscle contractants including channel blockers, miotics and anti-cholinergics, anti-glaucoma compounds, anti-parasite and/or anti-protozoal compounds, modulators of cell-extracellular matrix interactions including cell growth inhibitors and anti-adhesion molecules, vasodilating agents, inhibitors of DNA, RNA or protein synthesis, anti-hypertensives, analgesics, anti-pyretics, steroidal and non-steroidal anti-inflammatory agents, anti-angiogenic factors, anti-secretory factors, anti-coagulants and/or antithrombotic agents, local anesthetics, ophthalmics, prostaglandins, anti-depressants, anti-psychotic substances, anti-emetics, and imaging agents. In certain embodiments, the bioactive agent is a drug.

A more complete listing of bioactive agents and specific drugs suitable for use in the present invention may be found in "Pharmaceutical Substances: Syntheses, Patents, Applications" by Axel Kleemann and Jurgen Engel, Thieme Medical Publishing, 1999; the "Merck Index: An Encyclopedia of Chemicals, Drugs, and Biologicals", Edited by Susan Budavari et al., CRC Press, 1996, and the United States Pharmacopeia-25/National Formulary-20, published by the United States Pharmcopeial Convention, Inc., Rockville Md., 2001, all of which are incorporated herein by reference.

"Tissue"; as used herein, the term "tissue" refers to a collection of similar cells combined to perform a specific function, and any extracellular matrix surrounding the cells.

BRIEF DESCRIPTION OF THE DRAWING

The patent or application file contains at least one drawing executed in color. Copies of this patent or patent application publication with color drawing(s) will be provided by the Office upon request and payment of the necessary fee.

The invention is described with reference to the several figures of the drawing, in which.

DETAILED DESCRIPTION

Figure 1A:
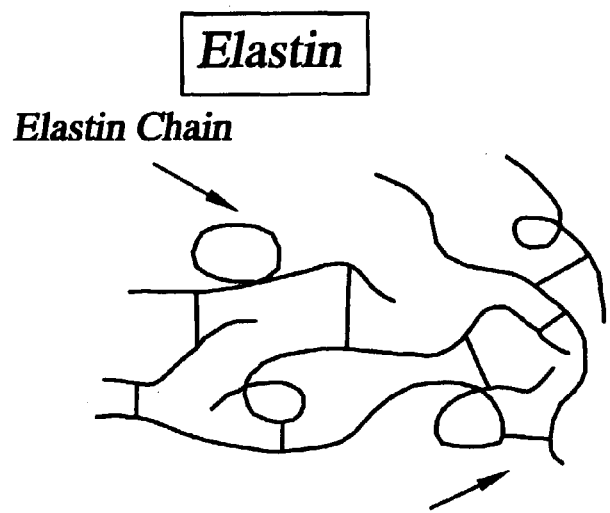
FIG. 1A is a schematic diagram of the cross-links in elastin.
Figure 1D:
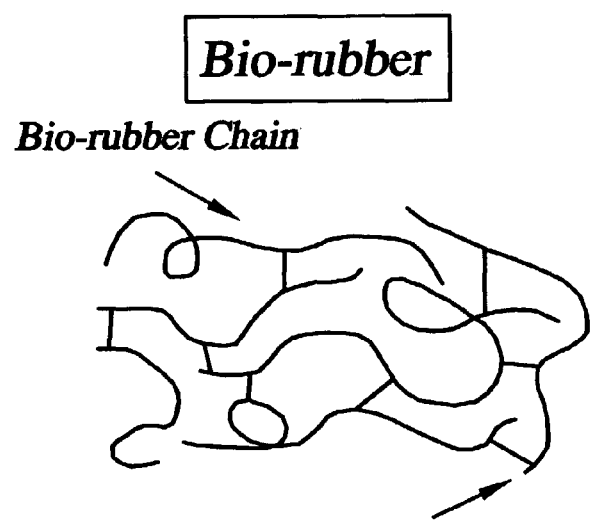
FIG. 1D is a schematic diagram of the cross-links in bio-rubber.
Figure 1B:
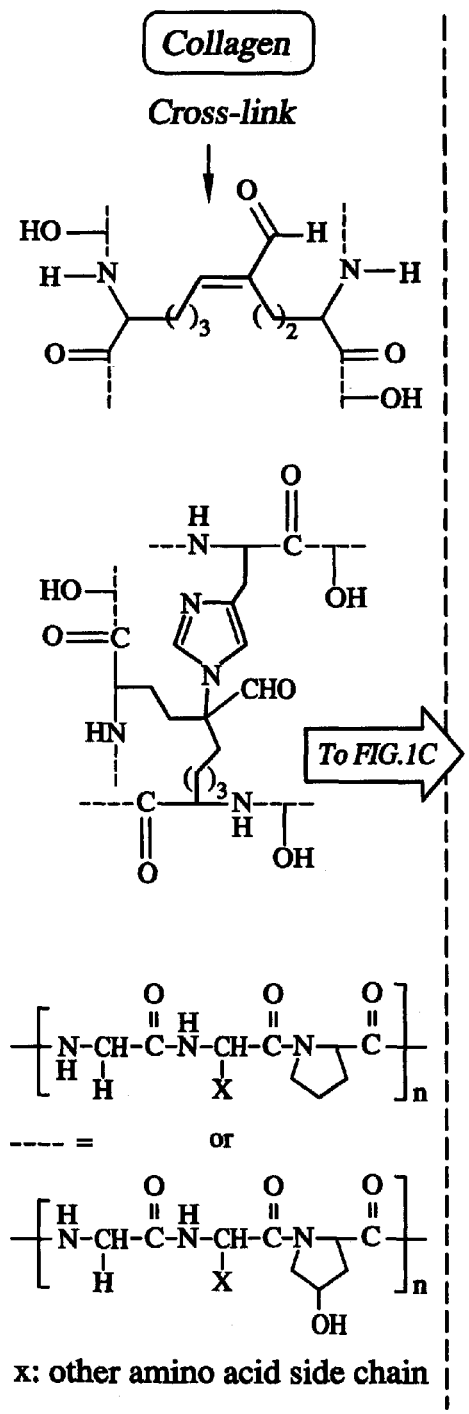
FIG. 1B illustrates the chemical structure of the cross-links in collagen.

Collagen and elastin are the major fibrous protein components of ECM. Collagen provides mechanical strength to ECM, while elastin adds rubber-like elasticity to certain ECM, such as those in the lungs, ligaments, and arteries (Matthews, C. K., et al., *Biochemistry*. The Benjamin/Cummings Publishing Company, Redwood City, 1990; Voet, D., et al., *Biochemistry*. John Wiley & Sons, Inc., New York, 1995). Both collagen and elastin are unusual proteins that are covalently cross-linked (FIG. 1A, FIG. 1B). Collagen is also unique in its high content of hydroxyproline, an amino acid rarely found in other proteins. In addition to covalent cross-linking, hydrogen bonding through hydroxyl groups of hydroxyproline also contributes to the mechanical strength of collagen (Voet, 1995; Stryer, L. *Biochemistry*. W. H. Freeman and Company, New York, 1995). This is manifested in various diseases where the strength of collagen fibers decreases markedly when cross-link density decreases significantly, or when the production of hydroxyproline is interrupted. The highly organized triple helical structure of collagen fiber also contributes to its great tensile strength. On the other hand, elastin forms a three-dimensional network of random coils that makes it elastomeric. (Matthews, 1990; Voet, 1995; Erman, B., et al. in *Science and Technology of Rubber*. Mark, J. E., Burak, E., and Eirich, F. R., eds., Academic Press, San Diego, 1994, pp. 189-210). Similarly, the elasticity of vulcanized rubber is attributed to its three-dimensional network of random coils.

Collagen fibers can sustain deformations of ~20% (Fratzl, P., et al., Fibrillar Structure and Mechanical Properties of Collagen. *J. Struct. Biol.* 122: 119-22 (1998); Wang, J. L., et al. Failure Criterion of Collagen Fiber: Viscoelastic Behavior Stimulated by Using Load Control Data. *Theor. Appl. Fract. Mech.* 27: 1-12, 1997), far greater than the most prevalent biodegradable polymers, poly(lactide), poly(glycolide) and their copolymers (PLGA) (Storey, R. F., et al., Methacrylate-endcapped Poly(D,L-lactide-co-trimethylene carbonate) Oligomers. Network Formation by Thermal Free-radical curing. *Polymer* 38: 6295-6301, 1997; Helminen, A., et al., Biodegradable Cross-linked Polymers Based on Triethoxysilane Terminated Polylactide Oligomers. *Polymer* 42: 3345-3353, 2001). The recoverable deformation is also greater than that of poly-4-hydroxybutyrate (P4HB), which is about 10%.

Based on the structural elements of collagen and elastin, we hypothesized that: (1) good mechanical properties could be obtained through covalent cross-linking (Lee, K. Y., et al., Controlling Mechanical and Swelling Properties of Alginate Hydrogels Independently by Cross-Linker Type and Cross-Linking Density. *Macromolecules* 33: 4291-4294, 2000; Anseth, K. S., et al. Photopolymerizable Degradable Polyanhydrides with Osteocompatibility. *Nat. Biotechnol.* 17: 156-9, 1999; Nagata, et al., Biodegradability of Poly(Ethylene Terephthalate) Copolymers with Poly(Ethylene Glycol)s and Poly(Tetramethylene Glycol). *Polym. Int.* 39: 83-9, 1996) of polymers and hydrogen bonding of hydroxyl groups; and (2) rubber-like elasticity could be obtained by building a three-dimensional network of random coils through copolymerization where at least one monomer is trifunctional (Erman, 1994).

To realize this design, we considered the following criteria: (1) degradation mechanism—we chose hydrolysis over enzymatic degradation, as enzyme level varies among individuals and enzymatic activities vary with time even for the same person (Langer, 2000); (2) hydrolysable chemical bond—we chose ester for its established and versatile synthetic methods (March, J. *Advanced Organic Chemistry*. John Wiley & Sons, Inc., New York, 1992); (3) cross-link density—low density is preferred, as high degree of cross-linking usually leads to rigid and brittle polymers; and (4) specific monomers—they should be non-toxic, at least one should be trifunctional and at least one should provide hydroxyl groups for hydrogen bonding.

Figure 1C:
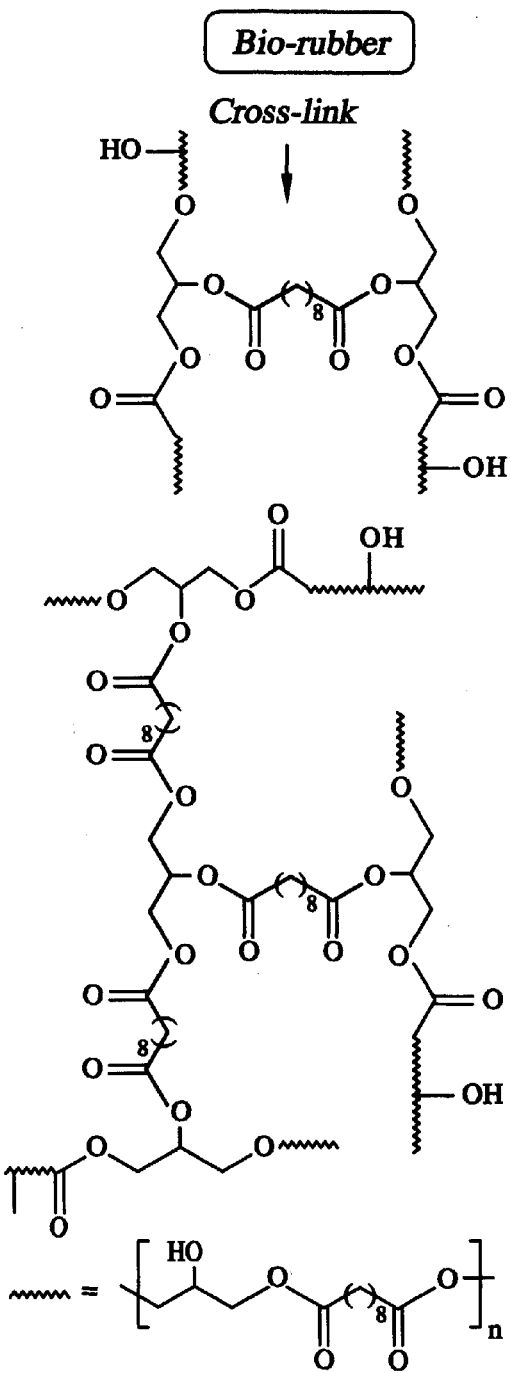
FIG. 1C illustrates the chemical structure of the cross-links in bio-rubber.

Glycerol [CH$_2$(OH)CH(OH)CH$_2$OH], the basic building block for lipids, satisfies all three requirements and was chosen as the alcohol monomer (FIG. 1C). From the same toxicological and polymer chemistry standpoints, we initially chose sebacic acid [HOOC(CH$_2$)$_8$COOH] as the acid monomer. Sebacic acid is the natural metabolic intermediate in ω-oxidation of medium to long chain fatty acids (Liu, G., et al. Mechanisms for the transport of Alpha, Omega-dicarboxylates Through The Mitochondrial Inner Membrane. *J. Biol. Chem.* 271: 25338-44, 1996; Grego, A. V., Dicarboxylic Acids, an Alternate Fuel Substrate in Parenteral Nutrition: An update. *Clin. Nutr.* 14: 143-8, 1995; Mortensen, P. B., The Biological Origin of Ketotic Dicarboxylic Aciduria. In vivo and in vitro Investigations of the Omega-Oxidation of C6-C16-monocarboxylic Acids in Unstarved, Starved and Diabetic Rats. *Biochim. Biophys. Acta* 666: 394-404, 1981; Mortensen, P. B., C6-C10-dicarboxylic Aciduria in Starved, Fat-fed and Diabetic Rats Receiving Decanoic Acid or Medium-chain Triacylglycerol. An in vivo Measure of the Rate of Beta-oxidation of Fatty Acids. *Biochim. Biophys.*

Acta 664: 349-55, 1981). It has been shown to be safe in vivo (Tamada, J., et al. The Development of Polyanhydrides for Drug Delivery Applications. *J. Biomater. Sci. Polym. Ed.* 3: 315-53, 1992) and the United States Food and Drug Administration has approved both glycerol and sebacic acid for medical applications. The resulting polymer, poly(glycerol-sebacate), or PGS, partly mimics the essence of the structural elements of collagen and elastin (FIG. 1D).

Other diacids of different lengths, including malonic acid [HOOC(CH$_2$)COOH] and succinic acid [HOOC(CH$_2$)$_2$COOH] up to long chain fatty acid dimers, may also be used to form elastomeric biomaterials according to the invention. Exemplary diacids include glutaric acid (5 carbons), adipic acid (6 carbons), pimelic acid (7 carbons), suberic acid (8 carbons), and azelaic acid (nine carbons). Exemplary long chain diacids include diacids having more than 10, more than 15, more than 20, and more than 25 carbon atoms. Non-aliphatic diacids may be used. For example, versions of the above diacids having one or more double bonds may be employed to produce glycerol-diacid co-polymers. Amines and aromatic groups may also be incorporated into the carbon chain. Exemplary aromatic diacids include terephthalic acid and carboxyphenoxypropane. The diacids may also include substituents as well. Reactive groups like amine and hydroxyl will increase the number of sites available for cross-linking. Amino acids and other biomolecules will modify the biological properties of the polymer. Aromatic groups, aliphatic groups, and halogen atoms will modify the inter-chain interactions within the polymer.

Elastomeric glycerol-diacid copolymers of the invention are also referred to as bio-rubber due to their biodegradability and elasticity. Most of the hydroxyl groups in collagen are from hydroxyproline, while the hydroxyl groups in bio-rubber are from non-cross-linked glycerol. The cross-links in bio-rubber can be oligomeric as well. We anticipated this biomimetic approach would yield biodegradable polymers with improved mechanical properties and biocompatibility.

In a preferred embodiment, the glycerol-diacid copolymers of the invention have a tensile elastic modulus of 5 MPa or less. One skilled in the art will recognize that the modulus of the polymer may be adjusted depending on the application. For example, the polymer may have a modulus less than 3 MPa, less than 1 MPa, less than 0.5 MPa, less than 0.3 MPa, or less than 0.1 MPa.

The elastic modulus and degradation rate of the polymer is easily adjusted by modifying the cross-link density. In certain embodiments, the cross-link density of elastomeric polymers produced according to the invention may be 40% or less, less than 30%, less than 20%, less than 10%, or less than 5%.

Synthesis and Analysis

PGS was synthesized by polycondensation of 0.1 mole each of glycerol (Aldrich, Milwaukee, Wis.) and sebacic acid (Aldrich) at 120° C. under argon for 24 h before the pressure was reduced from 1 Torr to 40 mTorr over 5 h. The reaction mixture was kept at 40 mTorr and 120° C. for 48 h. Polycondensation of glycerol and sebacic acid yields a transparent, almost colorless elastomer that does not swell or dissolve in water. Alternate methods have been used to synthesize rigid, totally cross-linked polymers of glycerol and sebacic acid with a molar ratio of glycerol to sebacic acid of 2:3 (Nagata, 1999).

Preferred molar ratios for glycerol-diacid co-polymers produced according to the invention range from 1:1 to 1:1.5. Catalysts may be used to reduce reaction temperature, shorten reaction time, and increase individual chain length. However, the catalyst should be bio-compatible or easily removed. An exemplary FDA-approved catalyst is stannous octoate (bis(2-ethylhexanoate)tin(II)), available from Fluka and Strem.

A KBr pellet of newly prepared PGS was used for FTIR analysis on a Nicolet Magna-IR 550 Spectrometer. A Perkin-Elmer DSC differential scanning calorimeter was used for DSC measurements. Elemental analysis on vacuum-dried samples was performed by QTI Inc. (Whitehouse, N.J.). The water-in-air contact angle was measured at room temperature using the sessile drop method and an image analysis of the drop profiled with VCA2000 video contact angle system on slabs of polymer fixed on glass slides.

Figure 2:
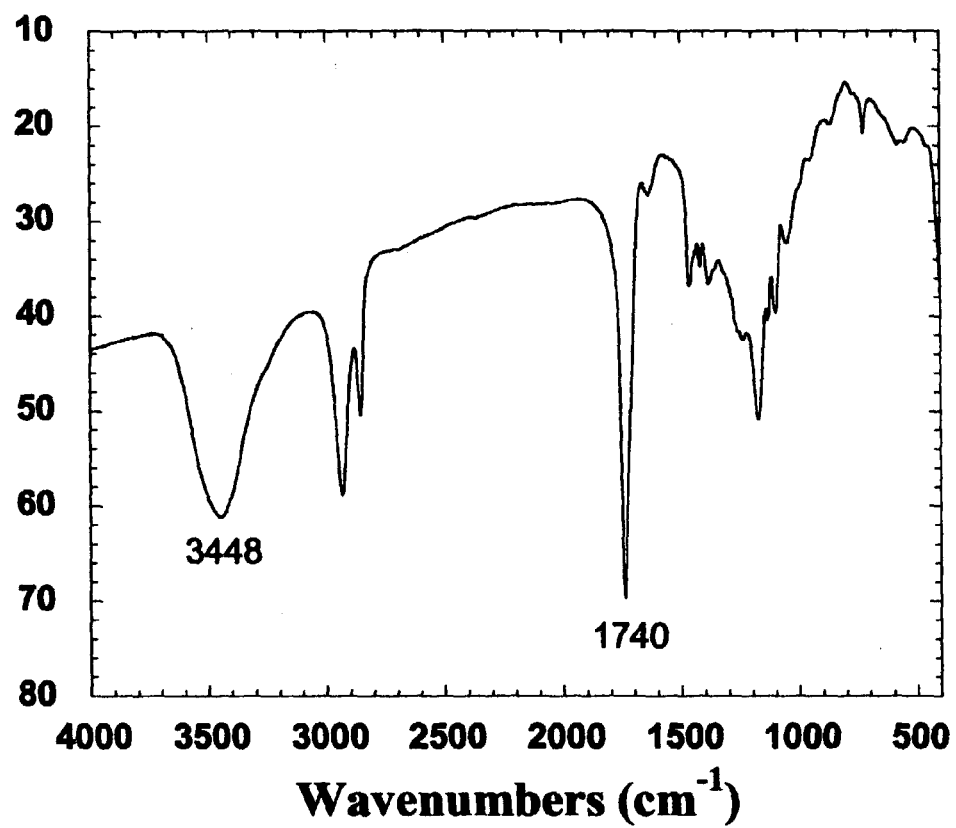
FIG. 2 shows the Fourier transformed infrared (FTIR) spectrum for bio-rubber.

Chemical analysis indicates that the polymerization reaction has a yield of close to 100%. For example, the FTIR spectrum does not show a carbonyl stretch for a free carboxylic acid group (FIG. 2A). The polymer features both hydroxyl groups and a small amount of cross-links directly attached to the backbone. The intense C=O stretch at 1740 cm$^{-1}$ in Fourier transformed infrared (FTIR) spectrum confirms the formation of ester bonds. FTIR also shows a broad, intense OH stretch at 3448 cm$^{-1}$, indicating the hydroxyl groups are hydrogen bonded (FIG. 2).

Elemental analysis confirms the composition of the PGS as approximately 1 glycerol:1 sebacic acid (calculated for $C_{13}H_{22}O_5$. C: calculated 60.47%, found 60.46%; H: calculated 8.53%, found 8.36%). The polymer is insoluble in water and swells 2.1+/-0.33% after soaking in water for 24 h. The polymer surface is very hydrophilic due to the hydroxyl groups attached to its backbone. Its water-in-air contact angle is 32.0°, almost identical to that of a flat 2.7 nm thick type I collagen film (31.9°) (See, Dupont-Gillain, et al., Collagen adsorption on poly(methyl methacrylate): net-like structure formation upon drying. *Polym. Int.* 48: 271-276, 1999).

The crosslinking density is expressed by n (moles of active network chains per unit volume), which is 38.3±3.40 mol/m$^3$, and M$_c$, the relative molecular mass between crosslinks, which is 18,300±1,620, calculated from the following equation (See, Sperling, L. H., *Introduction to Physical Polymer Science*, John Wiley & Sons, New York; 1992):

$$n = E_0/3RT = \rho/M_c$$

where $E_0$ is Young's modulus, R is the universal gas constant, T is the temperature, and $\rho$ is the density.

Differential scanning calorimetry (DSC) showed two crystallization temperatures at −52.14° C. and −18.50° C., and two melting temperatures at 5.23° C. and 37.62° C. No glass transition temperature was observed above −80° C., which is the lower detection limit of the instrument. The DSC results indicate that the polymer is totally amorphous at 37° C.

Similar to vulcanized rubber, this elastomer is a thermoset polymer. However, the uncrosslinked prepolymer can be processed into various shapes because it can be melted into liquid and is soluble in common organic solvents, such as 1,3-dioxolane, tetrahydrofuran, ethanol, isopropanol, and N,N-dimethylformamide. We have prepared PGS sheets and foams with these methods. Briefly, a mixture of NaCl particles of appropriate size and an anhydrous 1,3-dioxolane solution of the prepolymer was poured into a PTFE mold. One skilled in the art will recognize that other salts besides NaCl may also be employed. The polymer was cured in the mold in a vacuum oven at 120° C. and 100 mtorr. A porous scaffold was obtained after salt leaching in deionized water. Alternative porogens include azodicarboimide, which decomposes into nitrogen, carbon dioxide, and ammonia upon heating, and other porogens known to those skilled in the art. The primary requirements for ionic porogens are solubility in water and non-interference with polymerization.

Mechanical Testing

Figure 3A:
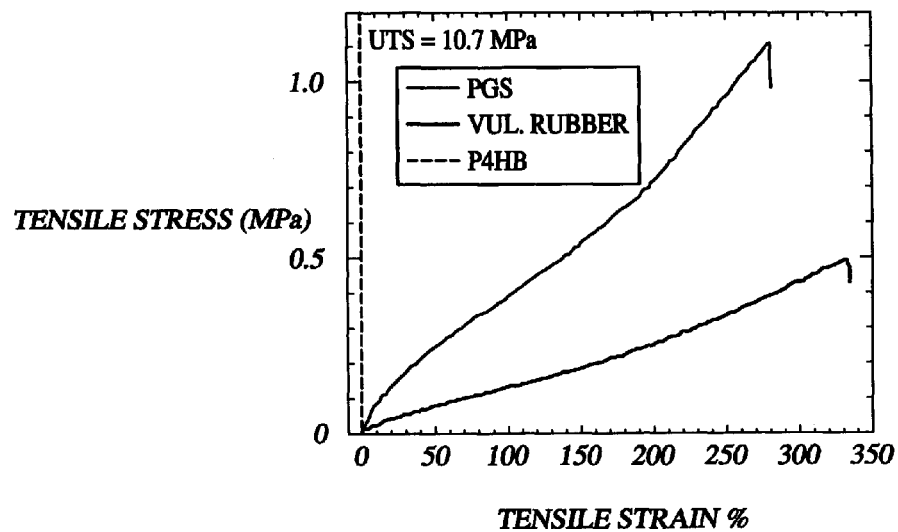
FIG. 3A shows the stress-strain curve for PGS, vulcanized rubber, and P4HB (UTS-ultimate tensile strength)
Figure 3B:
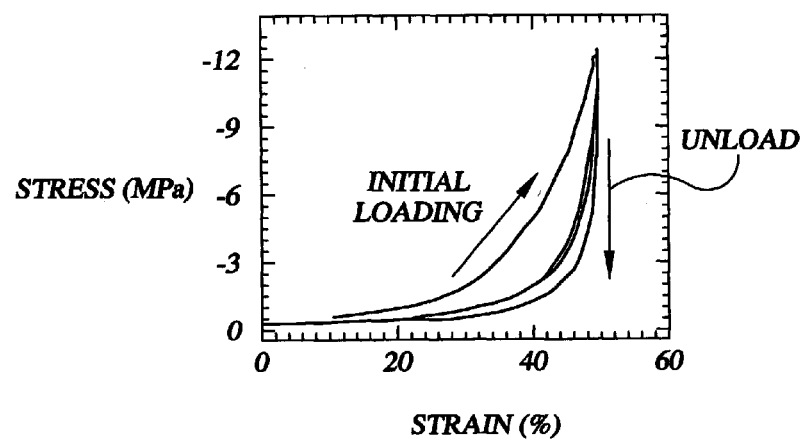
FIG. 3B shows the results of a compression test of PGS.

Tensile tests on thin strips of PGS reveal a stress-strain curve characteristic of an elastomeric and tough material (FIG. 3A, FIG. 3B). Tensile tests were performed on six 25×5×0.7 mm strips cut from polymer sheets according to ASTM standard D 412-98a on an Instron 5542 equipped with a 50 N load cell. Vulcanized rubber and P4HB (Metabolix, Cambridge, Mass.) strips (25×5×0.5 mm) were cut from polymer sheets. The deflection rate was kept at 50 mm/min. The samples were elongated to failure. Square discs of 5×5×2 mm were used for compression tests according to ASTM standard D575-91 on Instron 8501 equipped with a 5000 N load cell. The deflection rate was kept at 2 mm/min. The samples were compressed up to 70% and cycled 3 times.

The non-linear shape of the tensile stress-strain curve is typical for elastomers and resembles those of ligament (Yamaguchi, S., Analysis of Stress-Strain Curves at Fast and Slow Velocities of Loading in vitro in the Transverse Section of the Rat Incisor Periodontal Ligament Following the Administration of Beta-aminopropionitrile. *Arch. Oral Biol.* 37: 439-44, 1992; Komatsu, K., et al., The Effect of Velocity of Loading on the Biomechanical Responses of the Periodontal Ligament in Transverse Sections of the Rat Molar in vitro. *Arch. Oral. Biol.* 38: 369-75, 1993; Chiba, M., et al., Mechanical Responses of the Periodontal Ligament in the Transverse Section of the Rat Mandibular Incisor at Various Velocities of Loading in vitro. *J. Biomech.* 26: 561-70, 1993) and vulcanized rubber (Nagdi, K. *Rubber as an Engineering Material: Guideline for Users.* Hansesr, Munich, 1993) (FIG. 3A). Compared with hard and brittle materials, which have high modulus (the initial slope of the stress-strain curve) and low strain (relative deformation), PGS can be elongated repeatedly to at least three times its original length without rupture. The total elongation is unknown, because grip breaks occurred at 267±59.4% strain. The tensile Young's modulus of the polymer is 0.282±0.0250 MPa, indicating a soft material. The ultimate tensile strength is >0.5 MPa, the point at which the PGS strips broke from the grip of the mechanical tester. P4HB, a reportedly elastomeric degradable PHA (Poirier, Y., et al., Production of polyhydroxyalkanoates, a family of biodegradable plastics and elastomers, in bacteria and plants, *Biol. Technology,* 13:142-150, 1995; Sodian, R., et al., Fabrication of a trileaflet heart valve scaffold from a polyhydroxyalkanoate biopolyester for use in tissue engineering, *Tissue Eng.,* 6:183-187, 2000), has a strain to failure value of 11.1±0.491% and a Young's modulus of 253±5.29 MPa, similar to that of low-density polyethylene. The ultimate tensile strength is 10.4±0.554 MPa.

Overall, P4HB has a much higher modulus (stiffer) and much lower strain to failure compared with either PGS or vulcanized rubber. The value of the Young's modulus of PGS is between those of ligaments (kPa scale) (Yamaguchi, 1992; Komatsu, 1993; Chiba, 1993), which contain a large amount of elastin in addition to collagen, and tendon (GPa scale) (Fratzl, 1998; Wang, 1997; Misof, K. et al., A new molecular model for collagen elasticity based on synchrotron X-ray scattering evidence. *Biophys. J.* 72:1376-1381, 1997), which is mainly made of collagen. The strain to failure of PGS is similar to that of arteries and veins (up to 260%) (Lee, M. C., et al., Strain rate effects on tensile failure properties of the common carotid artery and jugular veins of ferrets. *J. Biomech.* 25:925-927, 1992), and much larger than that of tendons (up to 18%) (Haut, R. C. The effect of a lathyritic diet on the sensitivity of tendon to strain rate. *J. Biomech. Eng.* 107: 166-174, 1985). After soaking for 24 h in water, the weight of PGS barely changes, and the mechanical properties are virtually the same as dry polymer. Compression tests indicate that PGS can be compressed up to 70% repeatedly without rupture (FIG. 3B).

In Vitro Biocompatibility

The polymer appears to be biocompatible both in vitro and in vivo. Due to its elastomeric nature, bio-rubber may find applications in tissue engineering of soft tissues, especially muscle tissue, artery, and heart valves. In one study, we chose primary human aortic smooth muscle cells (HASMC) and primary human aortic endothelial cells (HAEC) to test the in vitro biocompatibility of the polymer. PGS samples were cut into approximately 10×10×0.2 mm slices, autoclaved at 120° C. for 20 min, and fixed in 6 wells of a 12-well plate (the polymer adheres easily to the surface with a slight pressure applied by a specula). Each well was filled with 2 ml of PBS and the solution was changed after 12 h. PBS was replaced by 2 ml of growth medium (Clonetics) 12 h later. After another 12 h, the media was removed and each well was charged with 1.75 ml of fresh medium. The plates were kept on a shaker in a 37° C. incubator during the above process. Each well was charged with 0.25 ml of single cell suspension (HASMC or HAEC, Clonetics), and the plate was put on a shaker at 40 rpm in a 37° C. incubator with 5% $CO_2$. The media was changed after 24 h. Media exchange was performed every 48 h after that. At day 7, phase contrast images were taken for both the polymer wells and the control wells on a Nikon Diaphot microscope equipped with a Nikon 6000 camera. The trypsinized cells were counted by Tripan-blue exclusion on a hemocytometer.

Figure 4B:
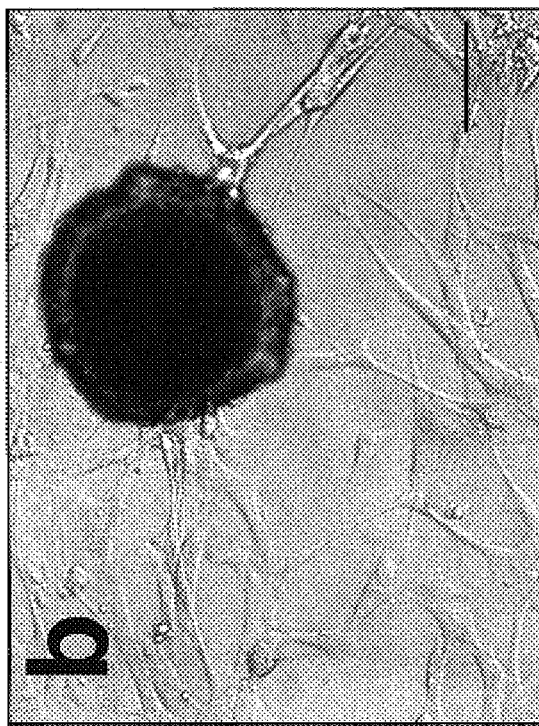
FIG. 4 are photomicrographs showing HASMC cell morphology and number in (A) polymer well and (B) control well seven days after seeding (scale bar=100 μm)
Figure 4A:
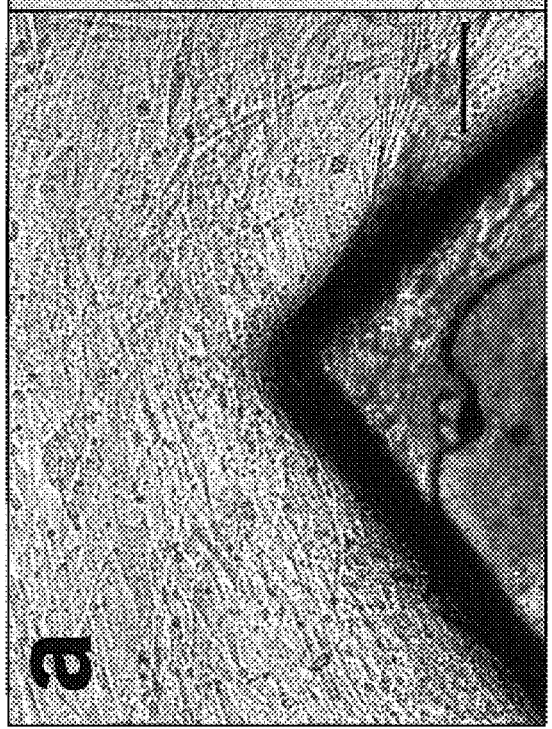

The cells in the polymer wells had normal morphology and reached confluence within 7 days (FIG. 4A). In contrast, most cells in control wells formed spheres and the few attached ones adopted a long thin thread-like morphology (FIG. 4B). Cells in the polymer wells not only had a normal morphology, but also proliferated faster relative to cells in control wells. Seven days after seeding, the number of viable cells in the polymer wells was about 4 times (HASMC) and twice (HAEC) as many as those in the control wells. While >96% of the cells are viable in the polymer wells, only 52% and 80% of the cells in the control wells were viable for HASMC and HAEC respectively.

In a second experiment, nine glass Petri dishes (60 mm diameter) were coated with 1,3-dioxolane solution of PGS prepolymer (1%). The coated dishes were transferred into a vacuum oven after evaporation of the solvent in air. The prepolymer was crosslinked into the elastomer after 24 h at 120° C. and 120 mtorr. Nine control dishes were coated with 1% $CH_2Cl_2$ solution of PLGA (50:50, carboxyl ended, relative molecular mass 15,000 ($M_r$ 15K), Boehringer Ingelheim, Ingelheim, Germany), and the solvent was evaporated for 24 h in air. The coated dishes were sterilized by UV radiation for 15 min. Each dish was soaked in growth medium for 4 h, replaced with fresh medium, and soaked for 4 h before cell seeding to remove any unreacted monomers or residual solvents. Each dish was seeded with 100,000 NIH 3T3 fibroblast cells and 8 ml of growth medium.

Figure 5A:
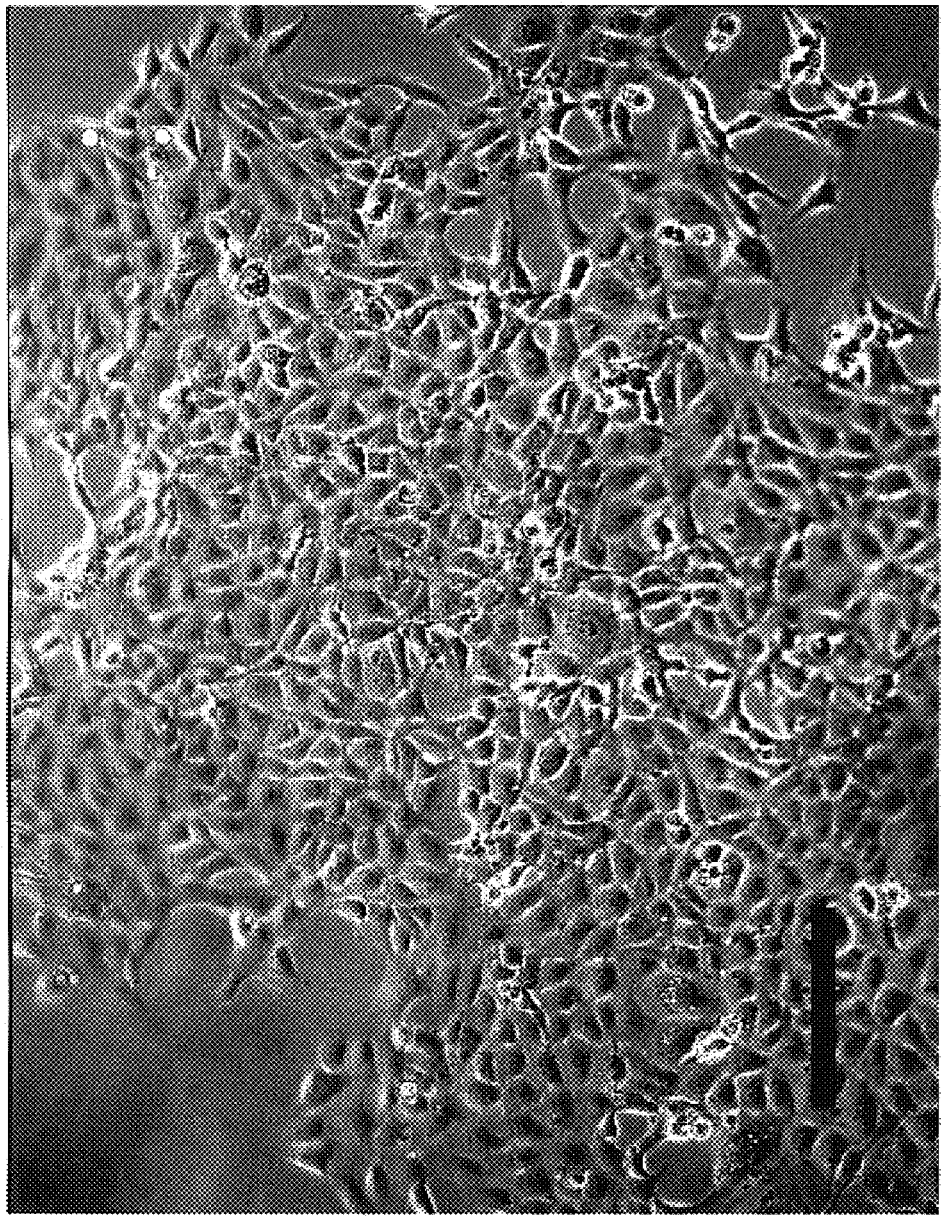
FIG. 5 are photomicrographs comparing NIH 3T3 fibroblast cell morphology and number in PGS sample wells (A) and PLGA control wells (B), six days after seeding. (scale bar=200 μm)
Figure 5B:
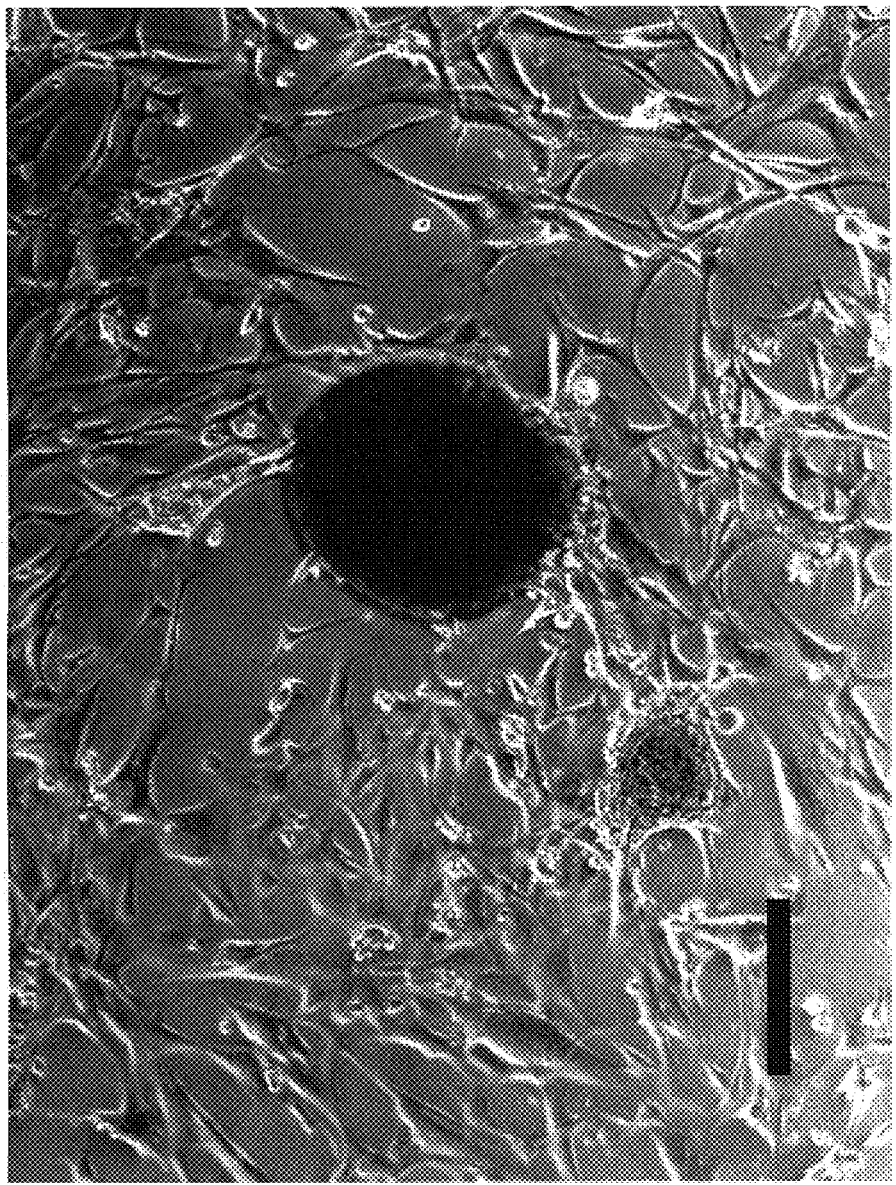
Figure 6:
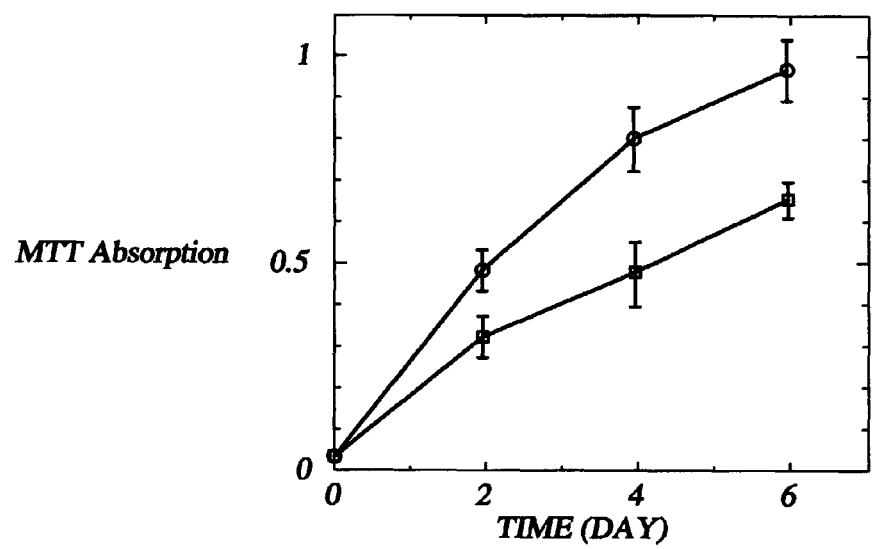
FIG. 6 is a graph comparing the growth rate of NIH 3T3 fibroblast cells in PGS (○) wells and PLGA (□) wells (MTT absorption measured at 570 nm, normalized value shown)

The cells were incubated at 37° C. with 5% $CO_2$. Cell density was measured by MTT assay (Hansen, M. B., et al., Re-examination and further development of a precise and rapid dye method for measuring cell growth/cell kill. *J. Immunol. Methods* 119:203-210, 1989). Medium exchange was carried out every 48 h. At day 6, phase contrast images were taken for both the polymer wells and the control wells on a Zeiss Axiovert 200 microscope equipped with a Dage 240 digital camera. The cells in PGS sample wells were viable and adherent and showed normal morphology with higher growth rate than the control, as tested by MTI assay (Northup, S. J., et al., In *Handbook of Biomaterials Evaluation*, von Recum, A. F., ed, Taylor & Francis, Philadelphia, 325-339, 1999) (FIGS. 5A, 6). Cells in PLGA wells tended to form clusters, and there was a greater number of floating cells; furthermore, most of the attached cells adopted a long, thin, threadlike morphology (FIG. 5B). These experiments suggest that PGS is at least as biocompatible as PLGA in vitro.

In Vivo Biocompatibility

Subcutaneous implantation of the polymer in Sprague-Dawley rats was used to test its biocompatibility in vivo. Polymer slabs of approximately 5×5×2 mm were autoclaved before being implanted subcutaneously in 15 seven-week-old female Sprague-Dawley rats (Charles River Laboratories) by blunt dissection. The animals were cared for in compliance with the regulations of MIT and the principles of Laboratory Animal Care published by the National Institute of Health (National Institutes of Health, *Principles of Laboratory Animal Care*, NIH pub. no. 85-23, rev. 1985). Each animal received two implants in the abdominal area. Every implantation site was marked by two tattoo marks 2 cm away from the implantation center. The animals were randomly divided into five groups. The body weights of the animals were monitored regularly. At each predetermined time point (5, 12, 19, 31, 60 days), one group of rats was sacrificed, and tissue samples (~15×15 mm) surrounding the implants were harvested with the intact implant. The samples were fixed in 10% formalin for 24 h. and embedded in paraffin after a series of dehydration steps in ethanol and xylenes. The slides were stained with hematoxylin and eosin (H&E) and Masson's trichrome stain (MTS).

Figure 7A:
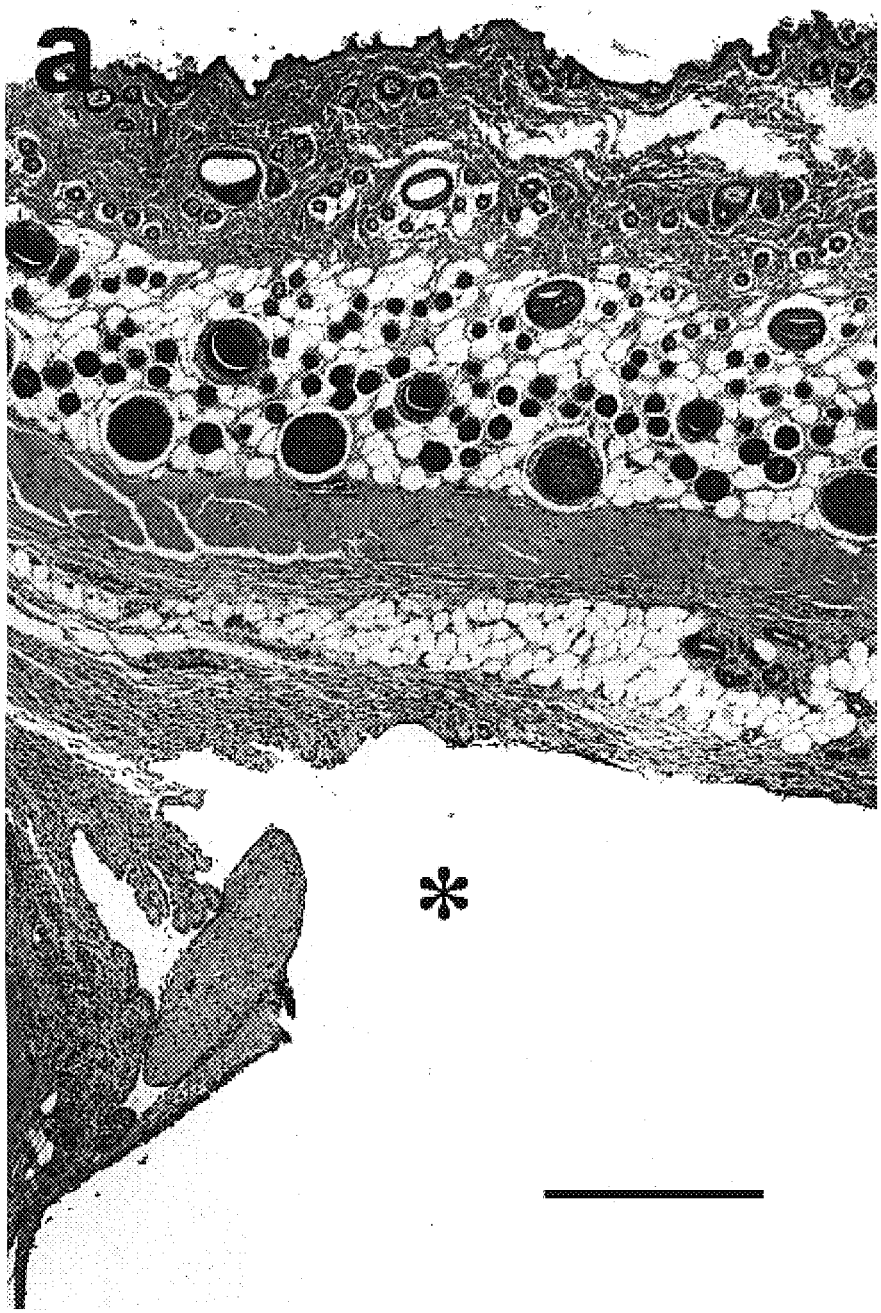
FIG. 7 is a series of photomicrographs (scale bar=500 μm) of rat skin (skin at top of micrograph) showing the entire skin thickness with subcutis at the PGS implantation site (indicated by *) with contrast provided by an H&E stain: (A) 5 days post-implantation (pi); (B) 12 days pi; (C) 60 days pi.

At 5 days postimplantation, the skin sections contained a single well-demarcated pocket within the subcuticular adipose tissue separating the discrete muscle layers immediately underlying the dermis (FIG. 7A). The overlying epidermis and dermis were unaffected. The pocket was lined by a moderately hypercellular 20-40 µm zone containing large numbers of fusiform endothelial cells with plump active nuclei defining dense nests of proliferating capillaries. There were low to moderate numbers of perivascular plasma cells and lymphocytes with occasional eosinophils and mast cells associated with the capillaries.

Figure 7B:
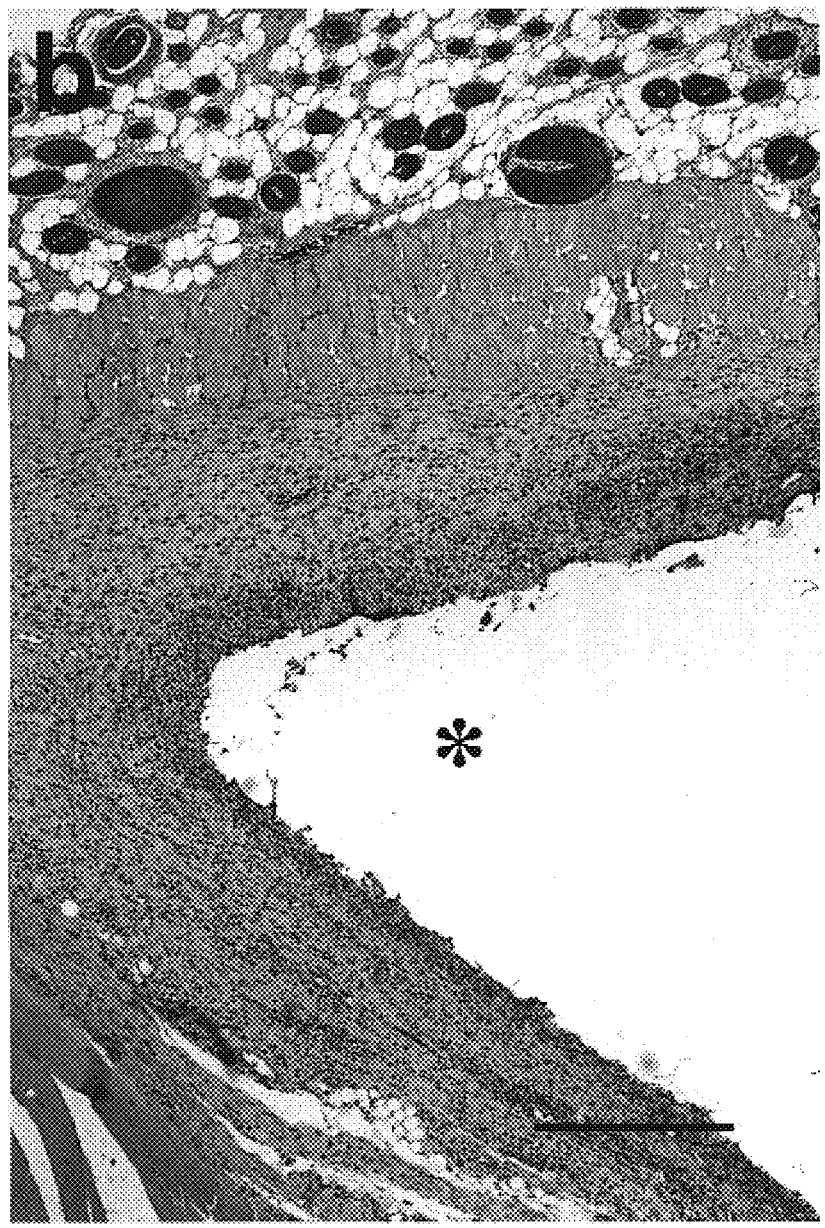
Figure 8A:
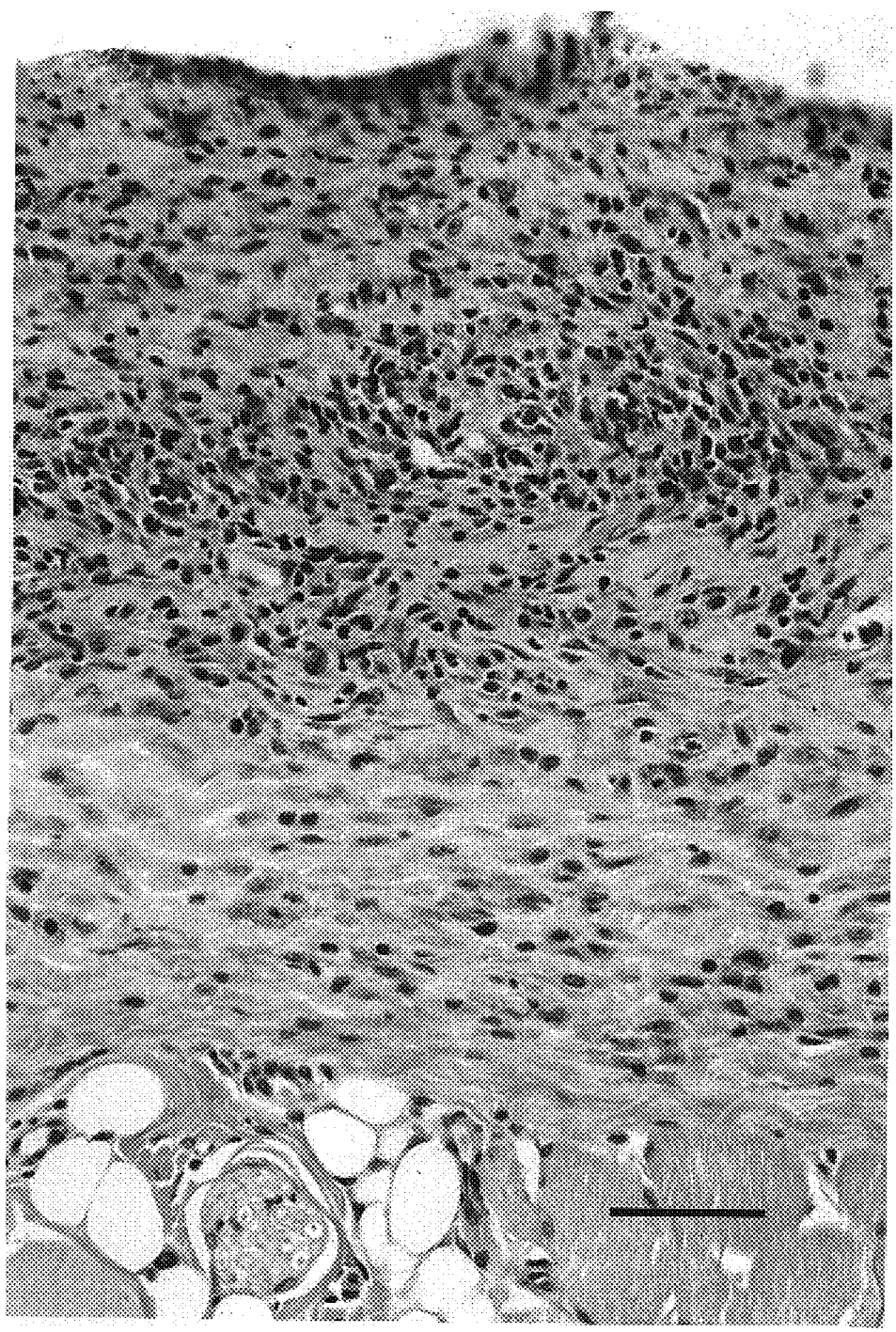
FIG. 8 is a series of photomicrographs of rat skin (skin at bottom of micrograph) showing the lumen wall characteristics and thickness after implantation of PGS with contrast provided by an H&E stain: (A) 12 days pi; (scale bar=100 μm) (B) 19 days pi, (scale bar=50 μm) inset MTS stain (C) 31 days pi, (scale bar=50 μm) inset MTS.

At 12 days, the zone of capillary proliferation and inflammation expanded modestly to approximately 50 µm in some areas while thinning in others. The pocket lining immediately adjacent to the implant showed a mild multifocal pattern of eosinophilic hyalinization with degeneration of some inflammatory cells (FIGS. 7B, 8A).

Figure 8B:
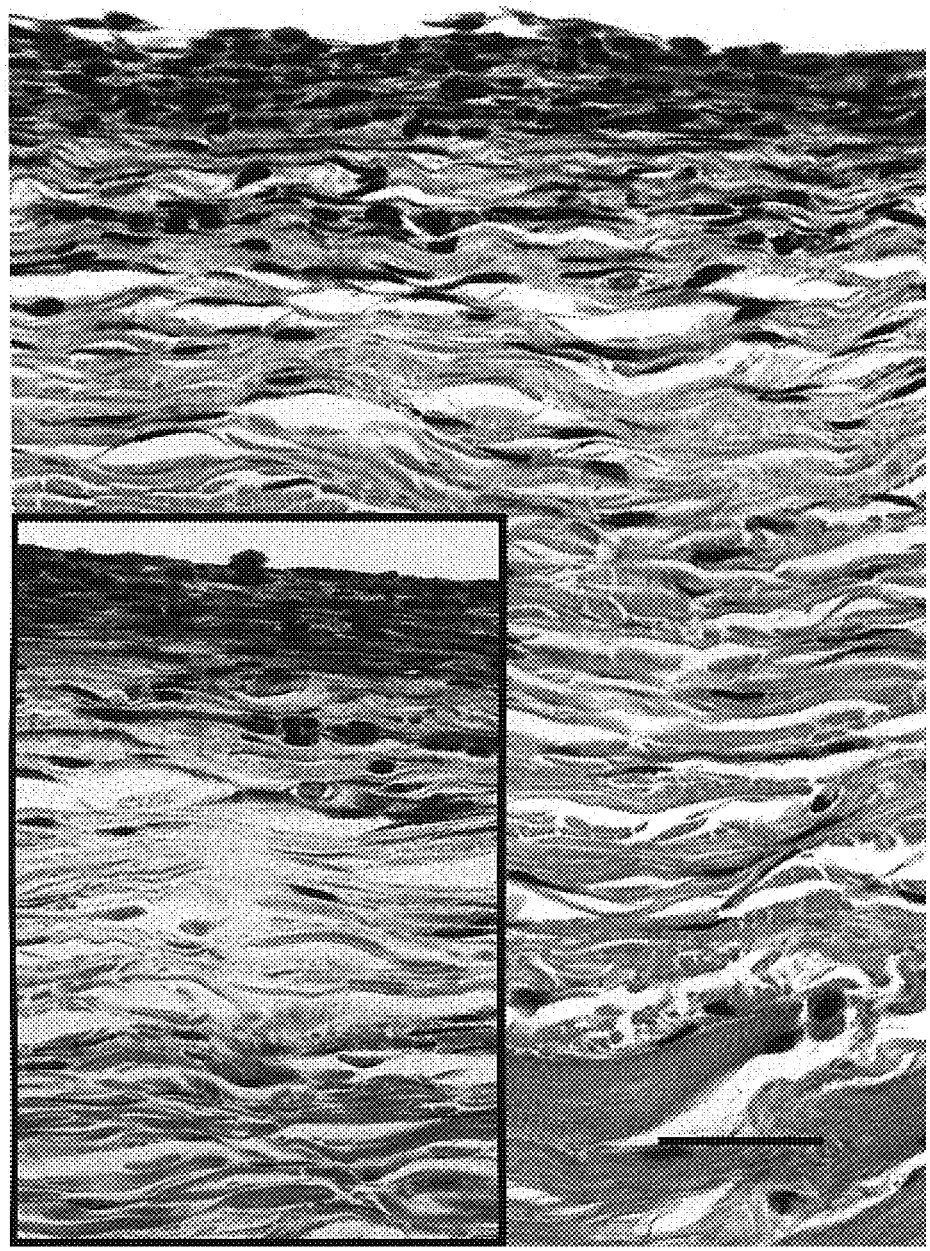

At 19 days, the perilumenal zone was significantly reduced in size to 10-20 µm associated with small numbers of remaining capillaries and significant resolution of the inflammatory component (FIG. 8B). Remaining inflammatory cells were degenerative and surrounded by small amounts of degenerating hyalinized collagen fibrils that were fragmenting into the lumen. There was a minimal amount of perilumenal collagen similar in fiber size and staining density to that of the adjacent normal tissue as demonstrated by Masson's trichrome stain (MTS) for collagen.

Figure 8C:
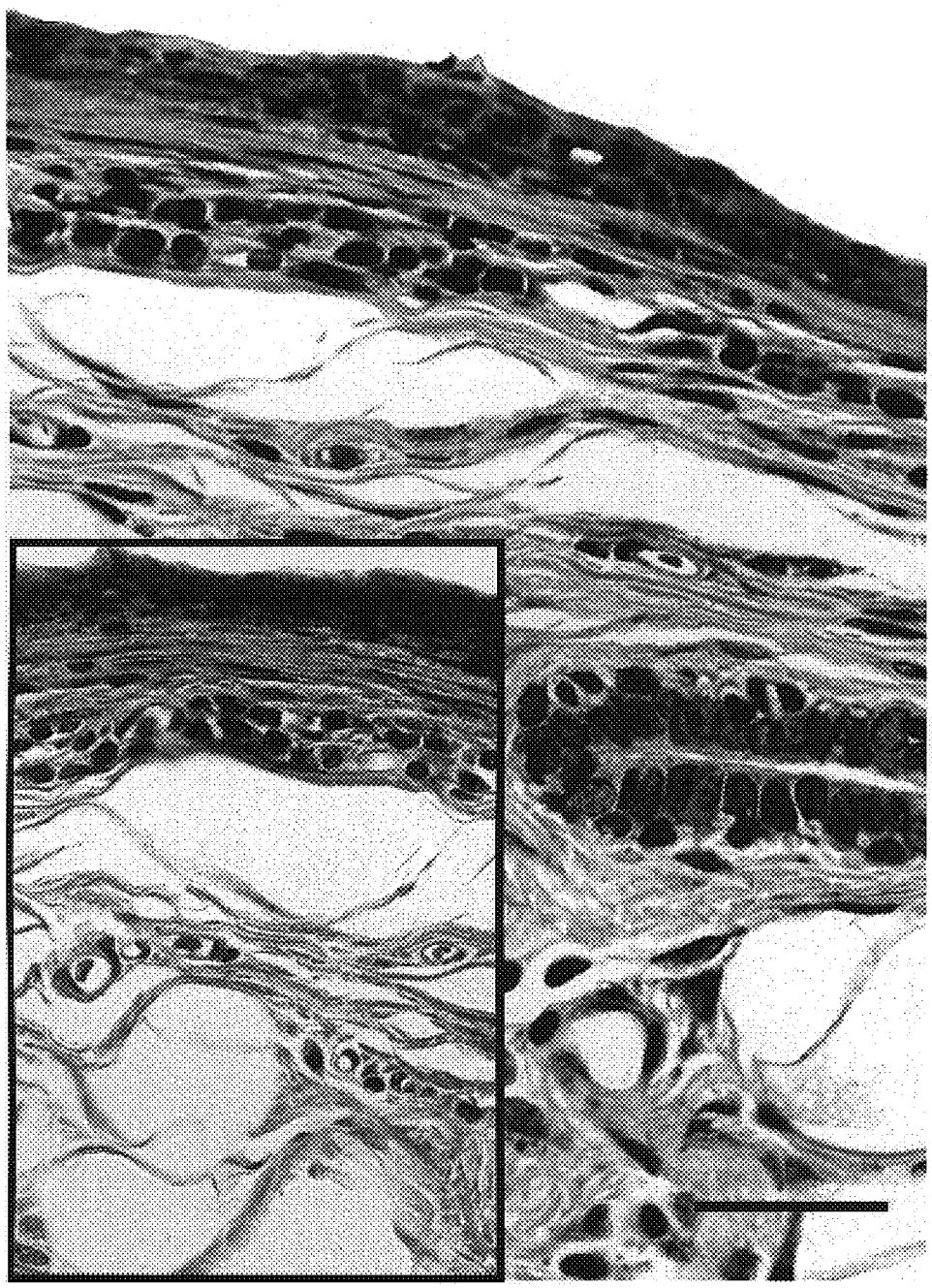

At 31 days, the perilumenal zone was reduced to 5-10 µm of hyalinized sloughing debris with a capillary and collagen density (MTS) consistent with adjacent normal tissue (FIG. 8C). There was a mild multifocal lymphoplasmacytic infiltrate approximately 10 µm from the lumen that was often associated with displaced hair fragments.

Figure 7C:
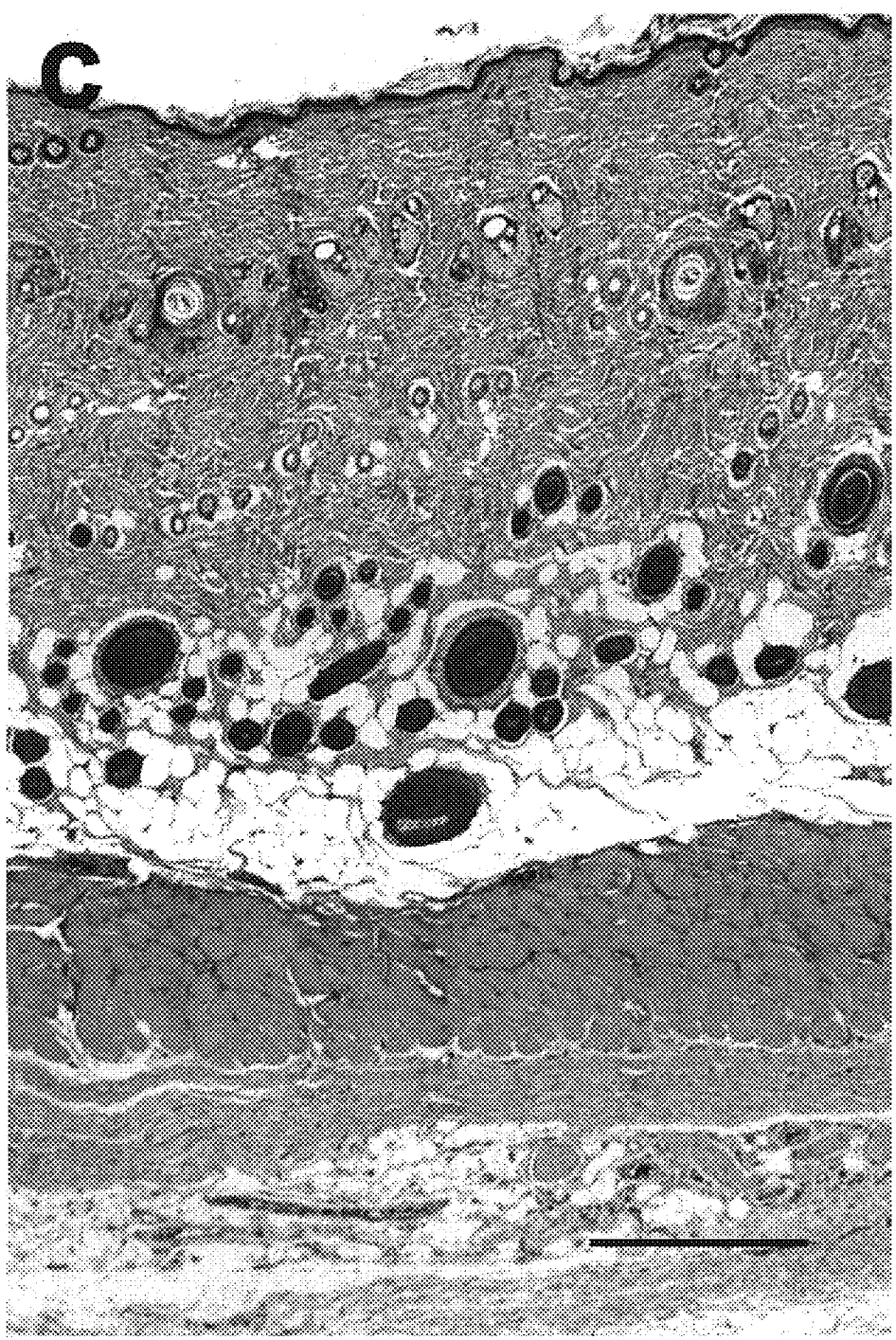

At 60 days, the implantation sites were undetectable despite repeated sectioning of the specimens at multiple levels (FIG. 7C). The overall architecture and the character of individual tissue components including collagen, vessel density and inflammatory cell infiltrates were unremarkable upon comparison to unimplanted control animals.

Figure 9:
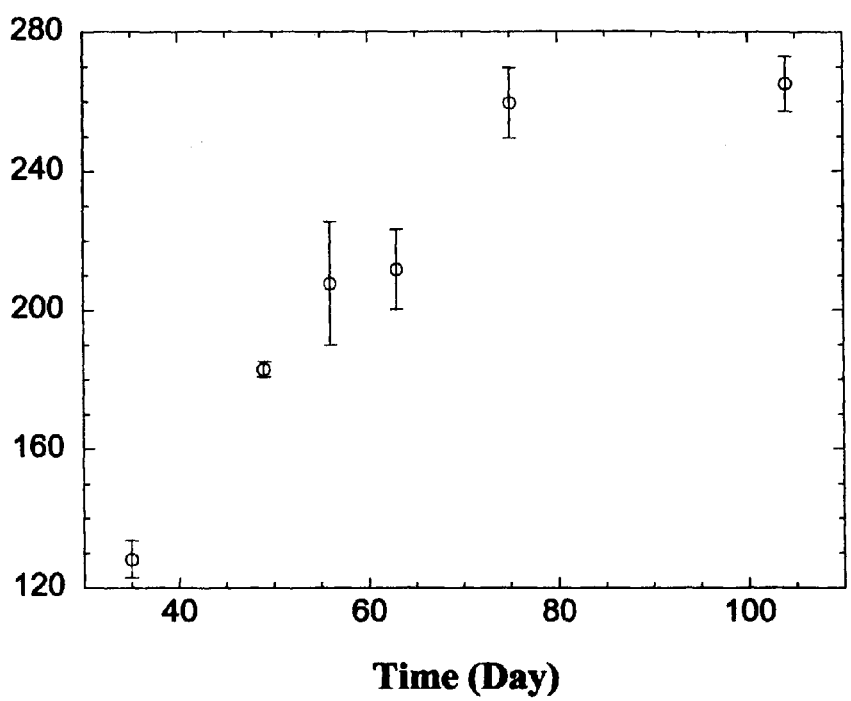
FIG. 9 is a graph showing the growth rate of rats after implantation of PGS grafts.
Figure 10A:
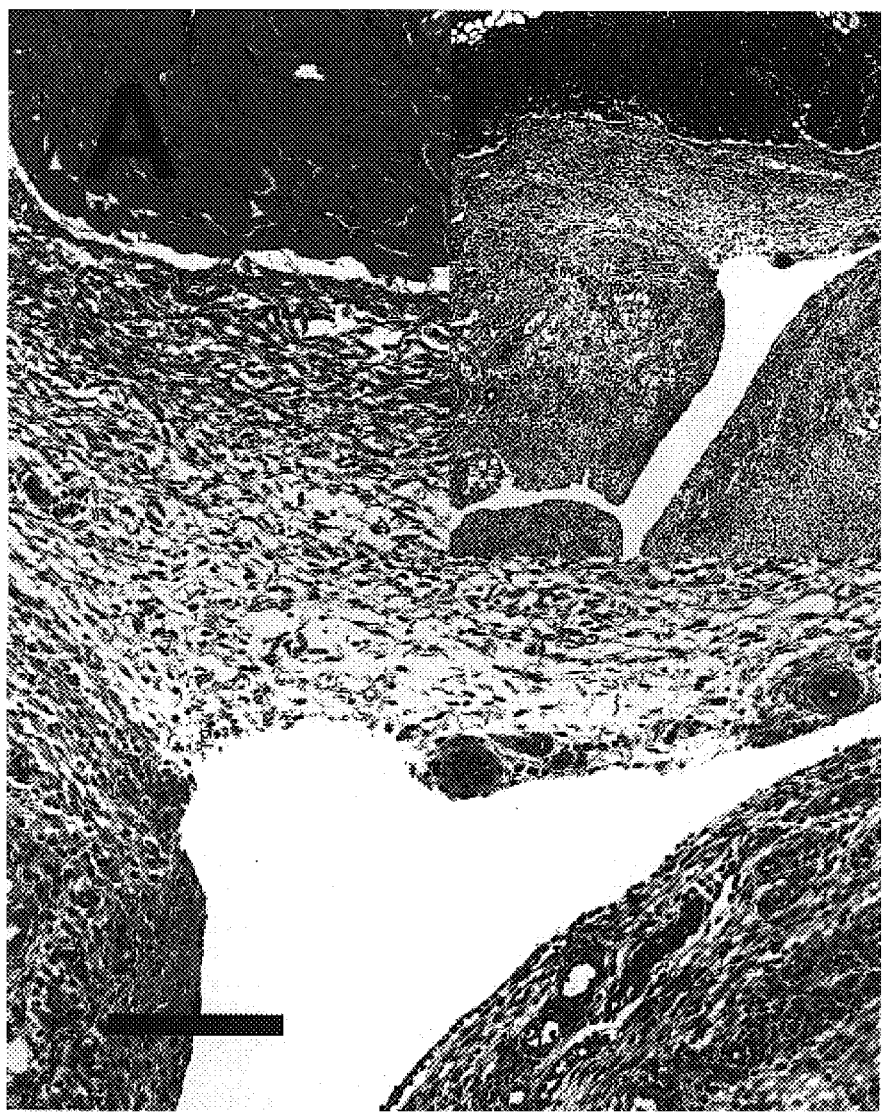
FIG. 10 is a series of photomicrographs of rat skin comparing lumen wall characteristics (H&E, 10×) and fibrous capsule thickness (insets, MTS, 5×) at implantation sites across time: (A,C,E) PGS 7, 21, and 35 days post-implantation, respectively; (B, D, F) PLGA, 7, 21, and 35 days post-implantation, respectively (top, skin; blank area, implantation site; scale bar=200 μm)
Figure 10B:
Figure 10C:
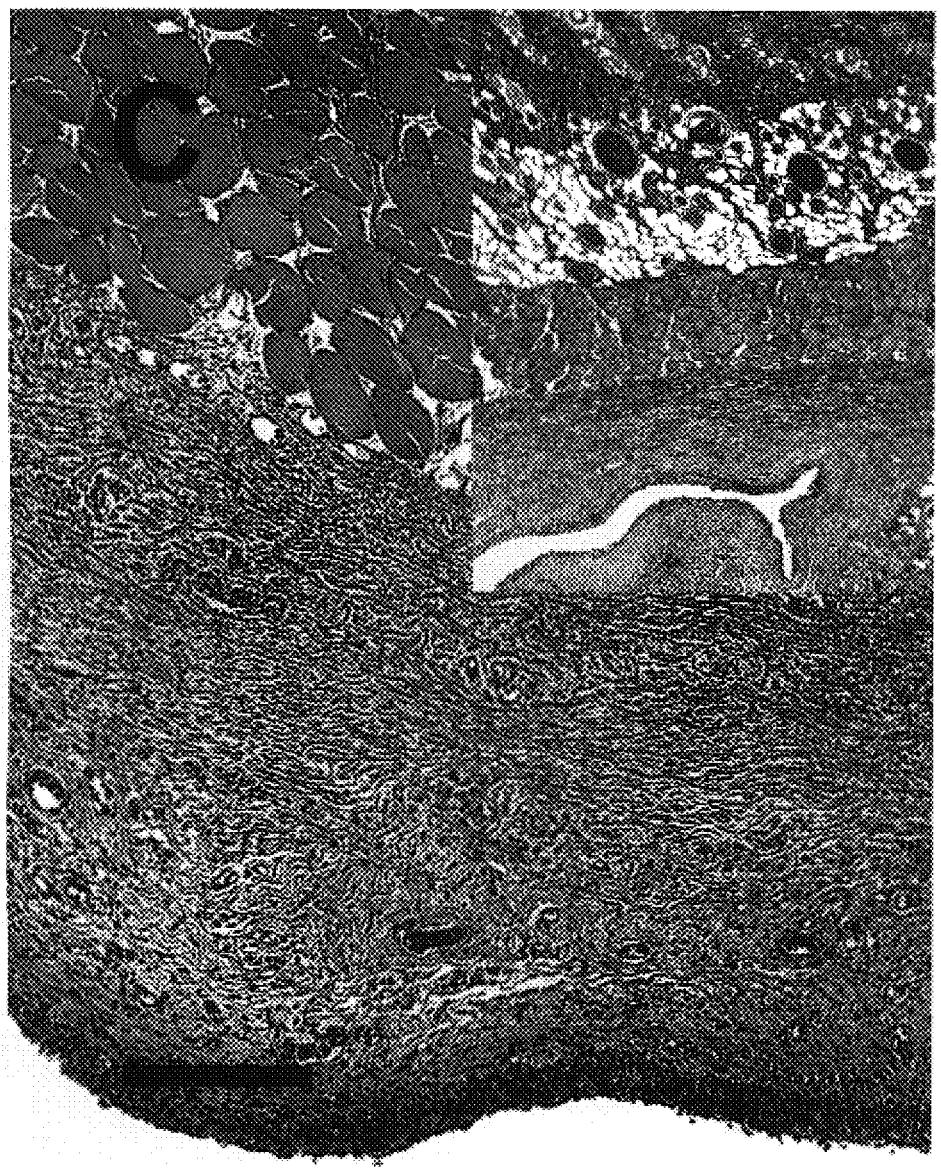
Figure 10D:
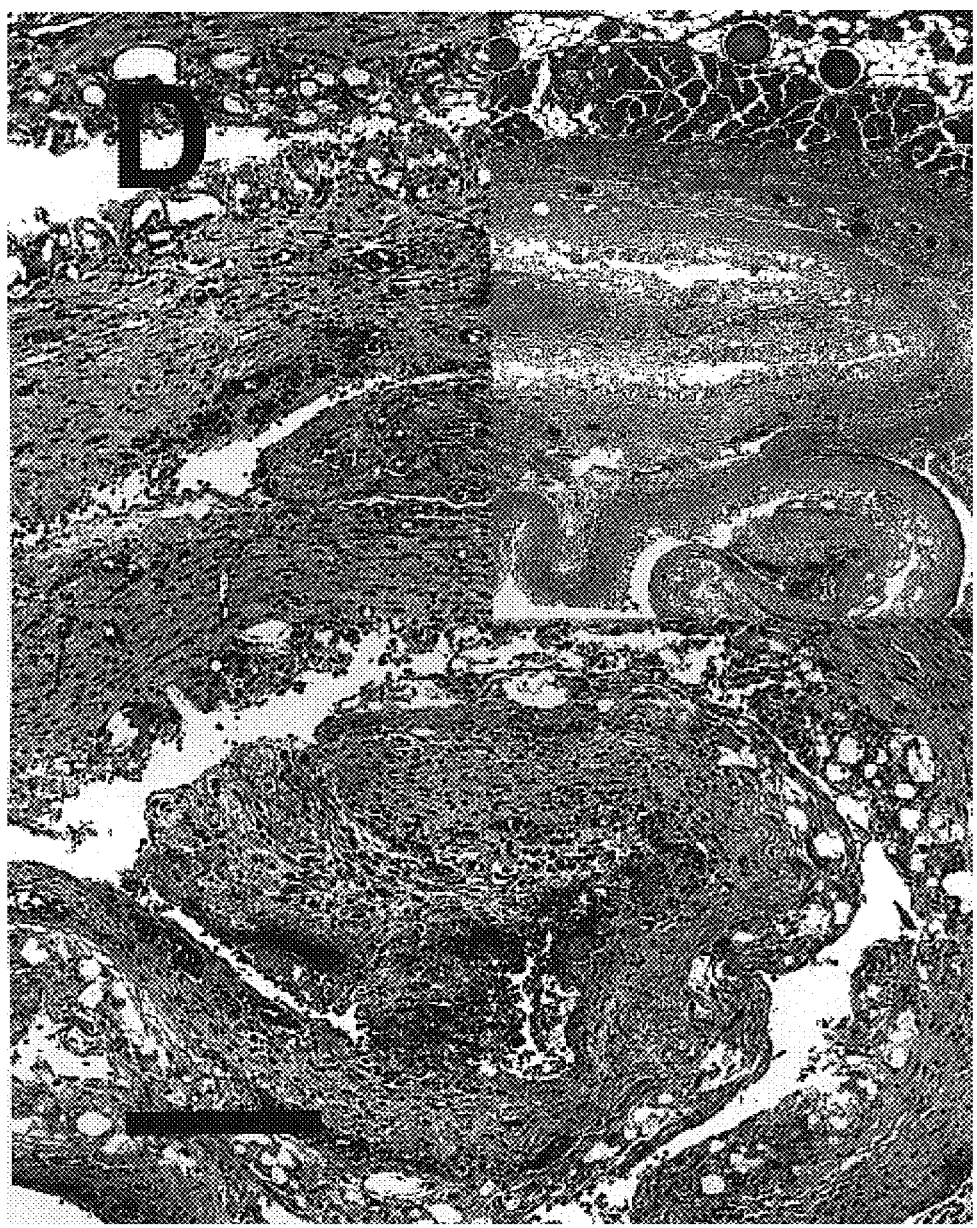
Figure 10E:
Figure 10F:

In summary, a modest focal inflammatory response was observed during the first 12 days after operation compared to healthy tissue from the same animal (FIGS. 7A, 7B). The inflammation quickly subsided, and was barely observable beyond 30 days. After 60 days, the implants were completely absorbed and implantation sites were undetectable despite repeated sectioning of the specimens (FIG. 7C). Careful examination at 60 days revealed no granulation or scar tissue, and the implantation site completely restored to its normal histological architecture. No fibrous capsule was formed around any implant at any of the time points sampled (FIGS. 8A-C). The density and staining of collagen fibers near the implants remained similar to that of adjacent normal tissue (FIGS. 8B, 8C). This is important for successful medical implants, as fibrous encapsulation inhibits mass transfer between the devices and their surrounding tissue. The growth rate of these rats was the same as normal rats (FIG. 9).

Subcutaneous implantation in Sprague-Dawley rats was also used to compare the in vivo biocompatibility of PGS and PLGA. Autoclaved PGS slabs of approximately 6×6×3 mm and ethylene oxide-sterilized PLGA (50:50, carboxyl ended, $M_r$ 15K, Boehringer Ingelheim) disks (2 mm thick, 12.5 mm diameter) were implanted subcutaneously in 15 seven-week-old female Sprague-Dawley rats (Charles River Laboratories, Wilmington, Mass.) by blunt dissection under deep isoflurane-$O_2$ general anesthesia. The surface area/volume ratio (1.33±0.04) was kept the same for both PGS and PLGA implants. Two implants each of PGS and PLGA were implanted symmetrically on the upper and lower back of the same animal. The animals were randomly divided into five groups. At each predetermined time point (7, 14, 21, 28, and 35 days), one group of rats was killed and tissue samples (~15×15 mm) surrounding the implants were harvested with the intact implant. The implant sites were marked and the samples processed as described above. At each time point, 12 slides for each polymer were obtained. All histologic preparations were assessed by a pathologist who was not informed of the identity of the polymer implant in each slide. The thickness of the inflammatory zone (H&E) and collagen deposition (MTS) for each polymer implant is expressed as the average value of three readings per slide of six slides at each time point.

Figure 11:
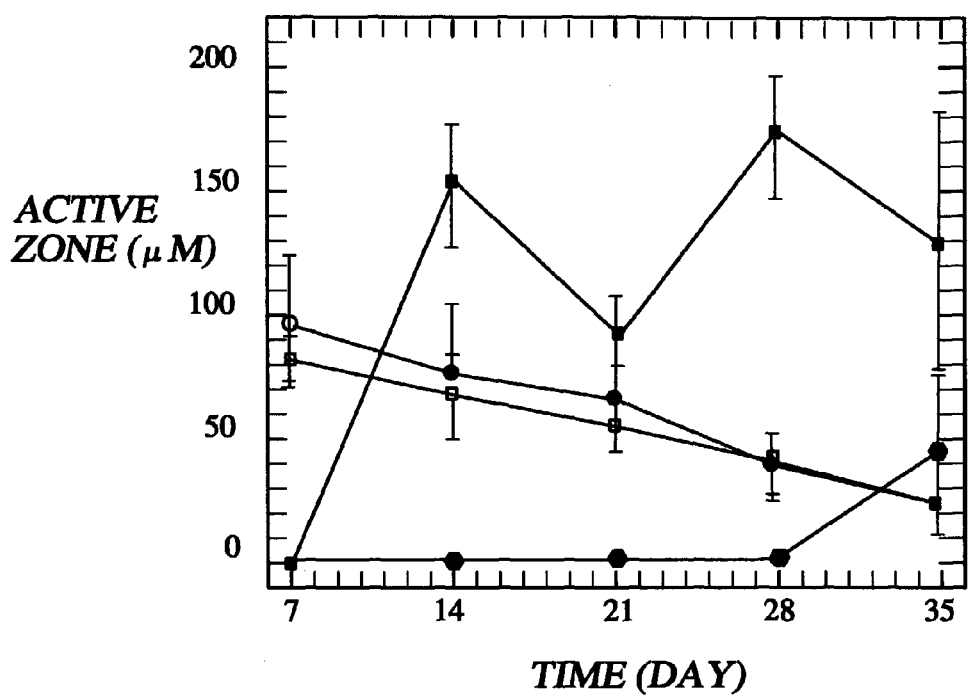
FIG. 11 is a graph depicting the change of thickness of the immune responses with time for PGS and PLGA (inflammatory zone: PGS (○); PLGA (□). Fibrous capsule: PGS (●); PLGA(■))
Figure 12:
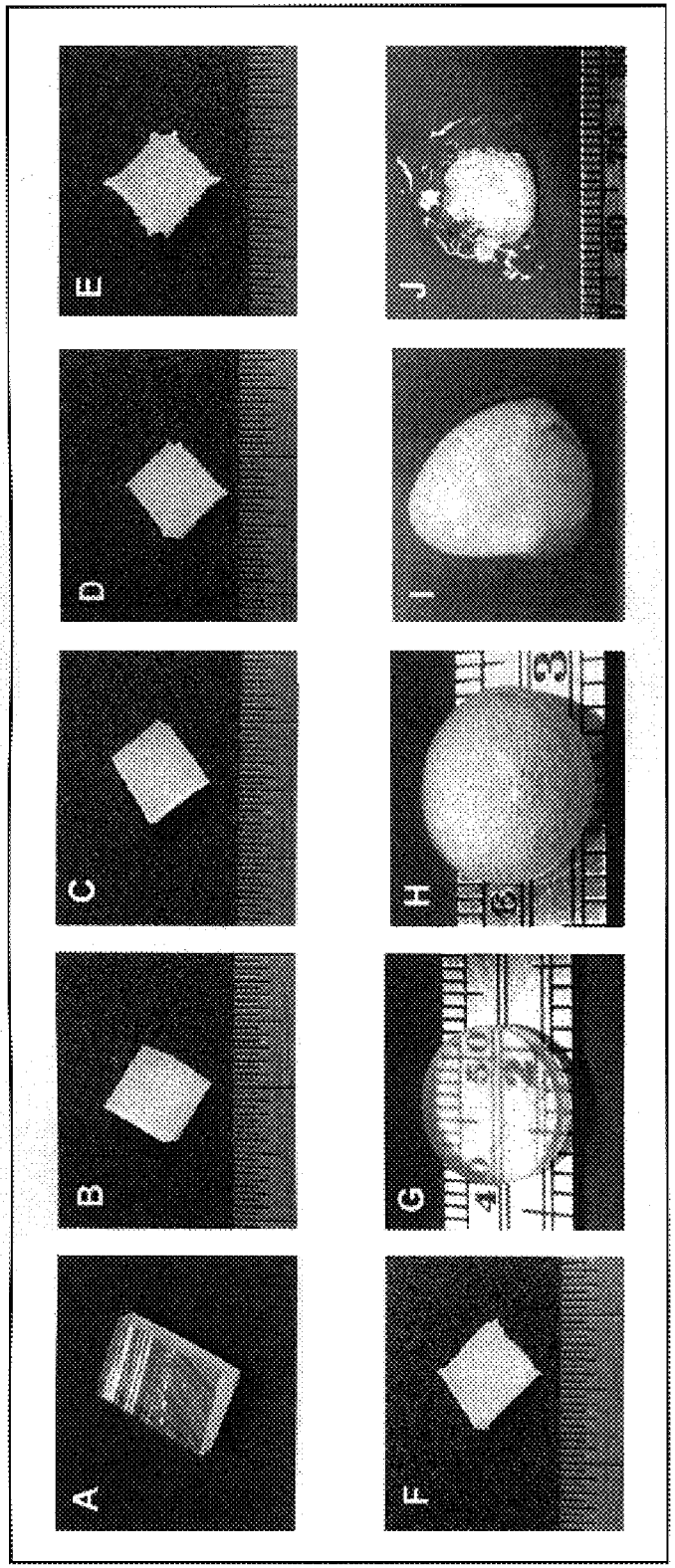
FIG. 12 is a series of photographs of PGS (A-F) and PLGA (G-J) explants at various time points of degradation (PGS, A: 0 day; B: 7 days; C: 14 days; D: 21 days; E: 28 days; F: 35 days. PLG, G: 0 day; H: 7 days; I: 14 days; J: 21 days)
Figure 13:
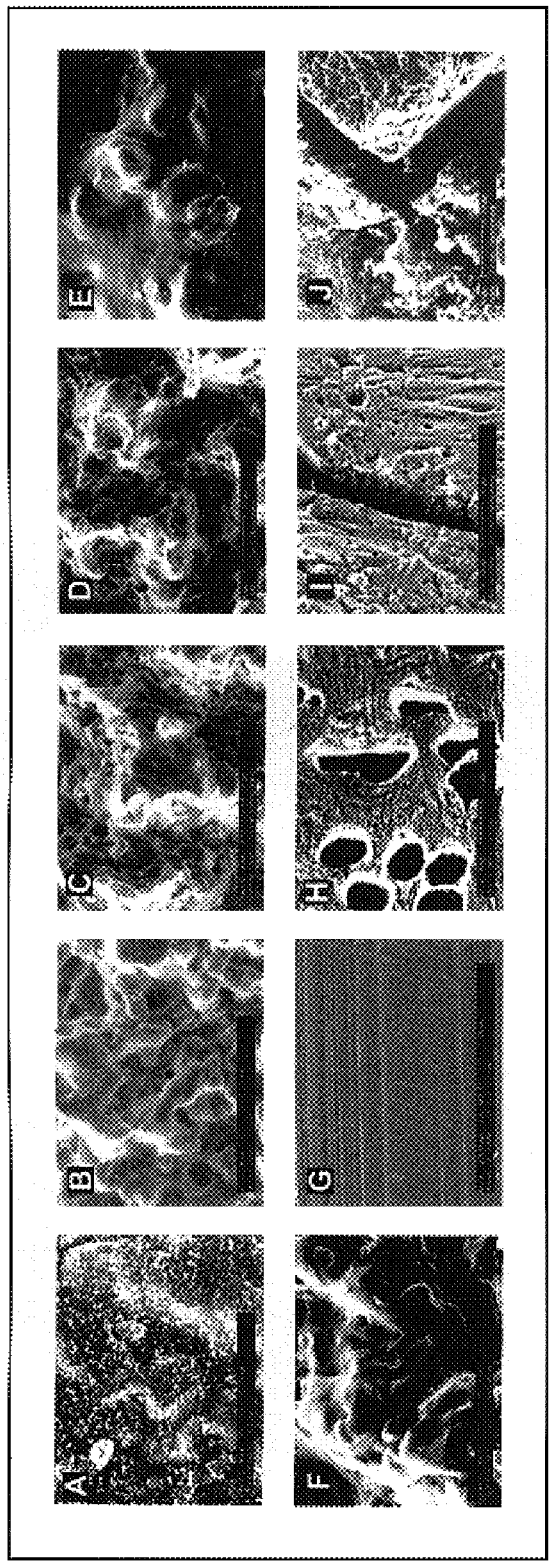
FIG. 13 is a series of scanning electron micrographs of PGS (A-F) and PLGA (G-J) explants at various time points of degradation (PGS, A: 0 day; B: 7 days; C: 14 days; D: 21 days; E: 28 days; F: 35 days. PLGA, G: 0 day; H: 7 days; I: 14 days; J: 21 days)

The inflammatory responses subsided with time for both polymer implants (FIGS. 10, 11). At 7 days postimplantation (p.i.), the lumenal wall was markedly thickened by a zone of dense vascular proliferation and mild inflammation without detectable collagen deposition (FIGS. 10A, 10B). At 21 days p.i., the lumenal wall was significantly thinner with a modest degenerative inflammatory infiltrate immediately adjacent to the polymer (FIGS. 10C, 10D). The PLGA implantation site was marked by a significant collagen fibrous capsule, which was absent in PGS. At 35 days p.i., the lumenal wall was reduced to a thin zone of cell debris with no vascular proliferation (FIGS. 10E, 10F). Collagen deposition in PGS implantation site was much thinner than that surrounding the fragmented PLGA implant.

In the first three weeks, the inflammatory response of PLGA implantation sites was ~16% thinner than that of PGS sites (FIG. 11). The thickness of the inflammatory zone in both implantation sites was approximately the same at weeks 4 and 5. Fibrous capsules (thick avascular collagen layer)

surrounding PLGA implants developed within 14 days, and their thickness remained ~140 µm (FIG. 10). Collagen deposition did not appear around PGS implants until 35 days post implantation. The collagen layer was highly vascularized and was only ~45 µm thick.

The inflammatory response and fibrous capsule formation observed for PLGA are similar to those reported in the literature (Cadee, J. A., et al., A comparative biocompatibility study of microspheres based on crosslinked dextran or poly (lactic-co-glycolic) acid after subcutaneous injection in rats. J. Biomed. Mater. Res., 56:600-609, 2001; van der Elst, et al., Bone Tissue response to biodegradable polymers used for intramedullary fracture fixation: a long-term in vivo study in sheep femora. Biomaterials., 20:121-128, 1999). Thick fibrous capsules block mass transfer between the implants and surrounding tissues, which an impair implant functions. Overall, the inflammatory response of PGS is similar to the PLGA. However, unlike PLGA, PGS induces little, if any, fibrous capsule formation.

Degradation of the Polymer

The degradation characteristics of PGS were examined both in vitro and in vivo. Slabs of dry polymer (5×5×2 mm) were weighed and transferred to 15 ml centrifuge tubes (Falcon) filled with PBS (pH: 7.4, Gibco, Carlsbad, Calif.) After 60 days, the samples were removed and washed with deionized water. The surface water was removed by Kimwipe, and the samples were weighed after drying at 40° C. in an oven for 7 days. The degree of degradation was determined by dry weight change.

Agitation for 60 days in phosphate buffered saline solution (PBS) at 37° C. caused the polymer to degrade 17±6% as measured by change of dry sample weight. In contrast, subcutaneous implants in rats were totally absorbed in 60 days. In the in vivo experiment, enzymes, and perhaps macrophages as well, may have caused differences in degradation rate. In vivo degradation thinned the polymer implants, with the explants maintaining their square shape and relatively sharp edges up to at least 35 days. Preliminary data indicate that mechanical strength probably decreases linearly with mass loss, e.g., ~60% strength with ~70% mass. Mechanical strength was measured on a nano-indenter that tests mechanical properties of minute samples. Both results suggest the polymer predominantly degrades through surface erosion. In contract, if the polymer exhibited bulk degradation, the mechanical strength would decrease well in advance of mass loss. The preservation of integrity during the degradation process can be important for certain types of tissue engineered implants, drug delivery devices, and in vivo sensors.

The in vivo degradation rates of PGS and PLGA were also compared. Flat sheets of PGS were cut into square blocks of 6×6×3 mm. Carboxylic acid ended PLGA (50:50, carboxyl ended, MW 15,000, Boehringer Ingelheim Inc., Germany) powder was pressed into round disks (diameter: 12.5 mm, thickness: 2 mm) by compression molding at 82° C. and 2000 psi for 6 min. The surface area/volume ratio was the same for PGS and PLGA samples. PGS samples were autoclaved (120° C., 20 min.), while PLGA samples were sterilized by ethylene oxide (4 h sterilization, 12 h ventilation) before implantation.

All samples were implanted subcutaneously in 15 seven-week-old female Sprague-Dawley rats. Each animal received 4 implants: 1 PGS and 1 PLGA each symmetrically on the upper and lower back. The animals were put under deep isofluorane/$O_2$ general anesthesia before the surgical sites were shaved and sterilized with betadiene and 70% ethanol. The implants were inserted into a subcutaneous pocket created by blunt dissection. The wound was closed by wound clips, and the surgical sites were sterilized again with 70% ethanol. The animals were randomly divided into 5 groups. All the wound clips were removed 7 days postimplantation.

At day 7, 14, 21, 28, and 35, implants were explanted from one group of animals under deep isofluorane/$O_2$ general anesthesia. Tissue samples (20×20 mm) surrounding the implants were removed with the implants intact. The implants were carefully removed and rinsed sequentially with phosphate buffered saline (PBS) solution and D.I. water.

Macroscopically, the PGS explants maintained its geometry throughout the time period tested (FIGS. 12A-F). In contrast, the geometry of PLGA explants was distorted within 14 days, most likely because of bulk degradation and swelling. They were deformed considerably from transparent disks to white opaque irregular lumps (FIGS. 12G-J). No PLGA implants were retrieved successfully beyond 3 weeks due to excessive swelling and the fragile nature of the implants.

SEM observation showed that the PGS explant surface maintained its integrity. Both pristine sterilized samples and cleaned and dried explants were mounted on aluminum stubs, and their surface morphologies were observed with a Philips FEI XL-30 FEG environmental scanning electron microscope under 2 Torr, 10 kV beam, 2.0 spot size, with gas phase secondary electron detector. Contoured features developed on the surface after autoclaving. Such features remained throughout the course of the experiment, however, no crack formation was observed (FIGS. 13A-F). In case of PLGA implants (FIGS. 13G-J), 20 µm holes developed on the surface 7 days postimplantation; cracks about 20 µm wide formed within 14 days; and, by 21 days, networks of both larger cracks wider than 40 µm and smaller cracks can be seen throughout the PLGA surface.

The degree of swelling of degradable polymers in vivo is a key parameter for proper implant materials. Excessive swelling is usually undesirable for an implant, as it distorts the shape of the implant and softens the polymer (Yoon, J J, et al., Degradation behaviors of biodegradable macroporous scaffolds prepared by gas foaming of effervescent salts. J. Biomed. Mat. Res. 55:401-408, 2001; Kranz, H., et al., Physicomechanical properties of biodegradable poly(D,L-lactide) and poly(D,L-lactide-co-glycolide) films in the dry and wet states. J. Pharm. Sci. 89:1558-1566, 2000). The swelling ratio was calculated from explant weight difference before and after drying: $(W_w-W_d)/W_d$, where $W_w$ is the wet sample weight and $W_d$ is the dry sample weight. The explants were cleaned and surface water removed with a Kimwipe before weighing. Each explant was thoroughly dried at 40° C. under vacuum (85 mTorr) for 48 h. Each explant was weighed again before any subsequent testing.

Figure 14A:
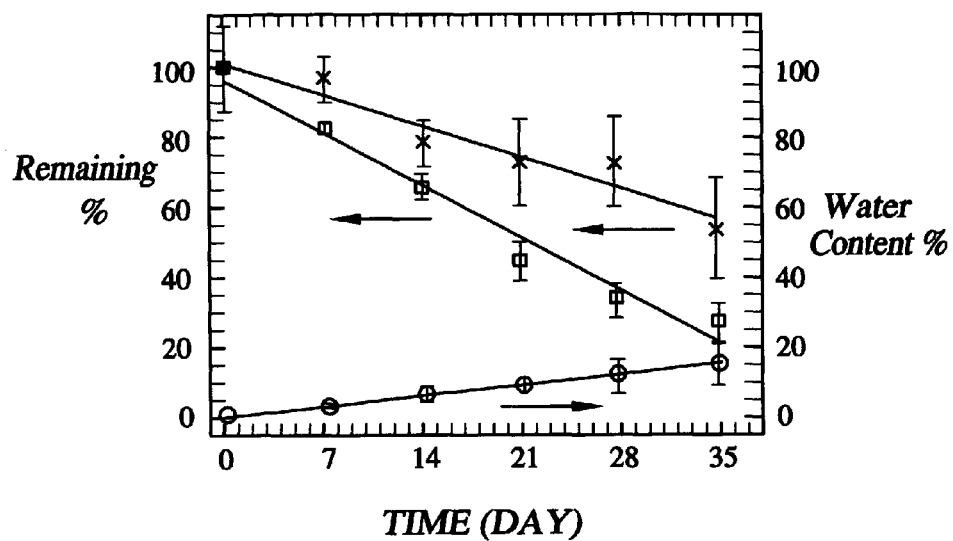
FIG. 14 is a graph comparing the changes in mass (□), mechanical strength (X), and water content (○) of (A) PGS (solid line) and (B) PLG (dashed line) implants upon degradation (error bars: standard deviation, n=6).
Figure 14B:
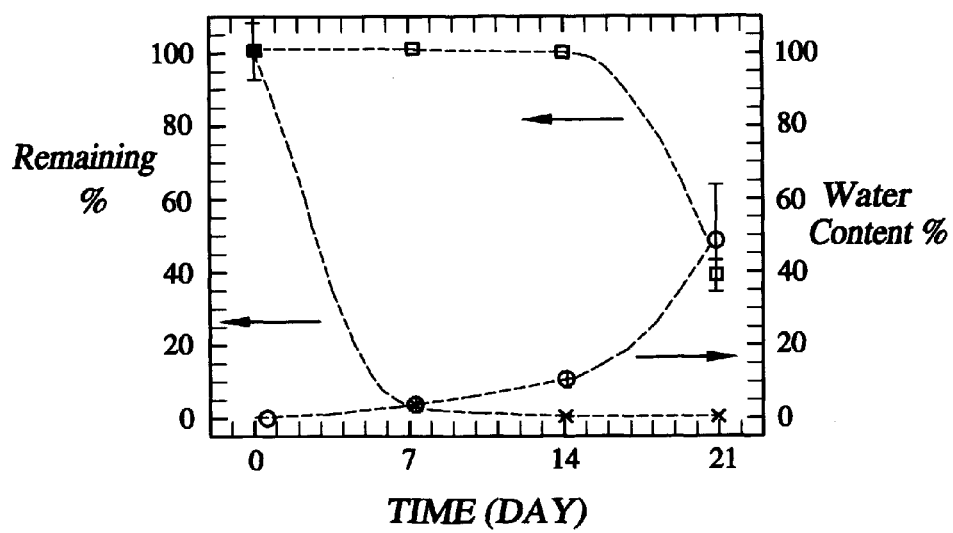

The water content of PGS implants rose linearly and reached 15% in 35 days, when the polymer degraded >70% (FIG. 14A). In contrast, water uptake of PLGA implants showed a time lag followed by a surge of water content, in a pattern similar to its mass loss (FIG. 14B). The water content of PLGA implants increased gradually to 11% within 14 days, then increased abruptly and reached 49% within the next 7 days.

The rate of mass loss is also an indicator of the degradation characteristics of a biodegradable polymer. PGS implants lost their weight steadily and linearly over the test period of 35 days, when they lost >70% of their mass (FIG. 14A). The mass loss of PLGA was negligible (<1%) within 14 days, then surged abruptly and reached 61% in the next 7 days (FIG. 14B). The catastrophic mass loss after initial lag for PLGA upon degradation is similar to what has been reported in the literature (Lu, L., et al., In Vitro and in vivo degradation of porous poly(dl-lactic-co-glycolic acid) foams. *Biomat.* 21:1837-1845, 2000; Vert, M., et al., More about the degradation of LA/GA-derived matrixes in aqueous media. *J. Controlled Release.* 16:15-26, 1991.

One of the key functions of a degradable polymer in an implant is to provide mechanical support. Hence, it is important to know how the mechanical strength changes with degradation. The explants were tested according to ASTM standard D575-91 on Instron 5542 frame equipped with a 50 N or a 500 N load cell. Briefly, the explants were compressed at a fixed ramp speed of 2 mm/min. PGS explants were compressed to 50% strain, while PLGA explants were compressed to failure. Pristine samples and PGS explants have regular geometry and were measured with a digital caliper (Mitutoyo, 500-196 CD-6"CS). PLGA explants deform upon degradation, and their dimensions were measured to the best approximation. In this study, the mechanical strength is expressed by the compression modulus of the explants at about $\frac{1}{3}$ of strain to failure (PLGA, 1%; PGS, 25%). The PGS implants lost mechanical strength gradually and slowly after implantation, about 8% each week. At day 35, when <30% of the PGS implant's mass was left, the modulus was >50% (FIG. 14A). In contrast, PLGA implants lost their mechanical strength shortly after implantation (>98% within 7 days). At 14 days, PLG implants' moduli were reduced to 0.25%. At 21 days, with 42% of the mass left, their moduli were reduced to 0.023% (FIG. 14B). This demonstrates that PGS implants maintained their mechanical strength much better than PLGA.

The differences in degradation characteristics between PGS and PLGA under identical conditions indicate they probably degrade by different mechanisms. Unlike PLGA, which degrades mostly by bulk degradation, in vivo degradation of PGS is dominated by surface erosion, as indicated by linear mass loss with time, preservation of implant geometry, better retention of mechanical strength, absence of surface cracks, and minimal water uptake. Upon degradation, PGS implants keep their integrity better than PLGA, and may prove useful in biomedical applications where such polymers are unsuccessful.

Composites and Mixtures

Bio-rubber may be combined with other polymers in blends and adducts to manipulate the degradation and mechanical properties of the material. Practically any biocompatible polymer may be combined with bio-rubber. In a preferred embodiment, the added polymer is biodegradable. Exemplary biodegradable polymers include natural polymers and their synthetic analogs, including polysaccharides, proteoglycans, glycosaminoglycans, collagen-GAG, collagen, fibrin, and other extracellular matrix components, such as elastin, fibronectin, vitronectin, and laminin. Hydrolytically degradable polymers known in the art include, for example, certain polyesters, polyanhydrides, polyorthoesters, polyphosphazenes, and polyphosphoesters. Biodegradable polymers known in the art, include, for example, certain polyhydroxyacids, polypropylfumerates, polycaprolactones, polyhydroxyalkanoates, poly(amide-enamines), polyamides, poly(amino acids), polyacetals, polyethers, biodegradable polycyanoacrylates, biodegradable polyurethanes and polysaccharides. For example, specific biodegradable polymers that may be used in the present invention include but are not limited to, polylysine, poly(lactic acid) (PLA), poly(glycolic acid) (PGA), copolymers and mixtures of PLA and PGA, e.g., poly(lactide-co-glycolide) (PLG), poly(caprolactone) (PCL), poly(lactide-co-caprolactone) (PLC), and poly(glycolide-co-caprolactone) (PGC). Those skilled in the art will recognize that this is an exemplary, not comprehensive, list of biodegradable polymers. The properties of these and other polymers and methods for preparing them are further described in the art. See, for example, U.S. Pat. Nos. 6,123,727; 5,804,178; 5,770,417; 5,736,372; 5,716,404 to Vacanti; 6,095,148; 5,837,752 to Shastri; 5,902,599 to Anseth; 5,696,175; 5,514,378; 5,512,600 to Mikos; 5,399,665 to Barrera; 5,019,379 to Domb; 5,010,167 to Ron; 4,806,621; 4,638,045 to Kohn; and 4,946,929 to d'Amore; see also Wang et al., *J. Am. Chem. Soc.* 123:9480, 2001; Lim et al., *J. Am. Chem. Soc.* 123:2460, 2001; Langer, *Acc. Chem. Res.* 33:94, 2000; Langer, *J. Control Release* 62:7, 1999; and Uhrich et al., *Chem. Rev.* 99:3181, 1999.

Bio-rubber may also be combined with non-biodegradable polymers. For example, polypyrrole, polyanilines, polythiophene, and derivatives thereof are useful electrically conductive polymers that can provide additional stimulation to seeded cells or neighboring tissue. Exemplary non-biodegradable polymers include, but are not limited to, polystyrene, polyesters, non-biodegradable polyurethanes, polyureas, poly(ethylene vinyl acetate), polypropylene, polymethacrylate, polyethylene, polycarbonates, and poly (ethylene oxide).

Alternatively or in addition, fibers and particles may be combined with the bio-rubber to modify its mechanical properties. For example, fibers, e.g., of collagen or PLGA, may be embedded in the bio-rubber to stiffen it. Particles of Bioglass™ or calcium phosphate ceramics may also be combined with the polymer.

Modification of Polymer Properties

The hydroxyl groups on bio-rubber provide sites to which molecules may be attached to modify the bulk or surface properties of the material (Jayachandran, K. N., et al., Synthesis of Dense Brush Polymers with Cleavable Grafts. *Eur. Polym. J.* 36: 743-749, 2000; Laschewsky, A., et al, Tailoring of Stimuli-responsive Water Soluble Acrylamide and Methacrylamide Polymers. *Macromol. Chem. Phys.* 202: 276-286, 2001). For example, tert-butyl, benzyl, or other hydrophobic groups may be added to the material to reduce the degradation rate. Polar organic groups such as methoxy also facilitate adjustment of both the degradation rate and hydrophilicity. In contrast, addition of hydrophilic groups, for example, sugars, at these sites would increase the degradation rate. Acids may also be added to the polymer to modify the properties of the material. For example, molecules with carboxylic or phosphoric acid groups or acidic sugars may be added. Charged groups such as sulfates and amines may also be attached to the polymer. Groups that are added to the polymer may be added via linkage to the hydroxyl group (substituting for hydrogen), linked directly to the polymer backbone by substituting for the hydroxyl group, or incorporated into an organic group which is linked to the polymer. For example, a charged amino acid such as arginine or histidine may be attached to the polymer to modify the degradation rate.

Attachment of such non-protein organic or inorganic groups to the polymer modifies the hydrophilicity and the degradation rate and mechanism of the polymer. Protecting group chemistry may also be used to modify the hydrophilicity of the material. One skilled in the art will recognize that a wide variety of non-protein organic and inorganic groups may be added to or substituted for the hydroxyl groups in the polymer to modify its properties. Exemplary functional groups are also described in March, *Advanced Organic Chemistry*. Fifth edition, John Wiley & Sons, Inc., New York, 1995, the entire contents of which are incorporated by reference herein.

To further control or regulate polymer interaction with cells, biomolecules, small molecules, or bioactive agents may be coupled to the hydroxyl groups or integrated into the polymer backbone (Barrera, D., et al., Synthesis and RGD Peptide Modification of a New Biodegradable Copolymer: Poly(lactic acid-co-lysine). *J. Am. Chem. Soc.* 115: 11010-11, 1993; West, J. L., et al., Polymeric Biomaterials with Degradation Sites for Proteases Involved in Cell Migration. *Macromolecules* 32: 241-244, 1999; Mann, B. K., Smooth Muscle Cell Growth in Photopolymerized Hydrogels with Cell Adhesive and Proteolytically Degradable Domains: Synthetic ECM Analogs for Tissue Engineering. *Biomaterials* 22, 3045-3051; 2001). Alternatively, biomolecules, small molecules, or bioactive agents may be encapsulated within the bio-rubber and perhaps linked to it using non-covalent interactions. Attachment of the moiety to the bio-rubber results in a slower release rate because it is released from the material as it degrades. In contrast, if the moiety is encapsulated within the bio-rubber, it may diffuse out of the material before the polymer degrades.

For example, biomolecules such as growth factors may be exploited to recruit cells to a wound site or promote specific metabolic or proliferative behavior in cells that are at the site or seeded within the matrix. Exemplary growth factors include, without limitation, TGF-β, acidic fibroblast growth factor, basic fibroblast growth factor, epidermal growth factor, IGF-I and II, vascular endothelial-derived growth factor, bone morphogenetic proteins, platelet-derived growth factor, heparin-binding growth factor, hematopoetic growth factor, and peptide growth factor. Integrins and cell adhesion sequences (e.g., the RGD sequence) may be attached to the bio-rubber to facilitate cell adhesion. Integrins are part of a large family of cell adhesion receptors that are involved in cell-extracellular matrix and cell-cell interactions. The RGD sequence, present in proteins such as fibronectin, has been shown to be active in promoting cell adhesion and proliferation (Massia, et al., *J. Cell. Biol.* 114:1089, 1991). Extracellular matrix components, e.g., collagen, fibronectin, laminin, elastin, etc., may be combined with bio-rubber to manipulate cell recruitment, migration, and metabolism and the degradation and mechanical properties of the material. Proteoglycans and glycosaminoglycans may also be covalently or non-covalently attached to bio-rubber.

Tissue Engineering Applications

The elasticity of bio-rubber recommends it for use in regenerating a variety of tissues. The material may be used to tissue engineer, for example, epithelial, connective, nerve, muscle, organ, and other tissues. Exemplary tissues that can benefit from the materials of the invention include artery, ligament, skin, tendon, kidney, nerve, liver, pancreas, bladder, and other tissues. Bio-rubber may also be used as the template for mineralization and formation of bone. Bio-rubber is especially recommended for regenerating tissues that are subject to repeated tensile, hydrostatic, or other stresses, such as lung, blood vessels, heart valve, bladder, cartilage and muscle.

Tissues experience mechanical forces and deformation in daily use, and tissue remodeling is often influenced by mechanical forces. For example, heart and other muscle will increase in density and size when they are frequently used and will atrophy under disuse. Mechanical force stimulates the cells that produce extracellular matrix elements to produce growth factors that promote either the production or degradation of ECM. Use of a material like bio-rubber that mimics a normal physiological response to mechanical forces will facilitate the regeneration of normal tissue, as mechanical stimulation can be applied early in the culturing of tissue engineered constructs.

For example, bio-rubber may be used to tissue engineer or regenerate a portion of a patient's bladder. In one embodiment, smooth muscle cells and urothelial cells are seeded onto bio-rubber. The cells may be allowed to proliferate before the implant is placed into a patient. To replace or regenerate cartilage, chondrocytes are seeded onto bio-rubber, which can withstand the cyclic shear and compressive forces cartilage is subjected to as joints bend.

Bio-rubber may also be used to produce prosthetic heart valves. Heart valves are very flexible and are subjected to cyclic deformation as the heart beats. The body repairs tears in heart valve through normal physiologic mechanisms and thus can regenerate heart valves made of biodegradable materials. A bio-rubber heart valve seeded with smooth muscle cells and endothelial cells will be remodeled in the body to produce a new, non-synthetic heart valve. In some embodiments, it may be desirable to add fibroblasts as well. In a preferred embodiment, the regeneration occurs over a period of 3 months. The degradation rate of the polymer is easily controlled by modifying the cross-link density and/or by modifying the hydroxyl groups with hydrophobic groups.

The shape of the bio-rubber may also be manipulated for specific tissue engineering applications. Exemplary shapes include particles, tubes, spheres, strands, coiled strands, films, sheets, fibers, meshes, and others. In one exemplary embodiment, microfabrication may be used to form capillary networks from bio-rubber. A silicon wafer is processed using standard microfabrication techniques to produce a capillary network having a desired pattern. The network is coated with a sacrificial layer, for example, sucrose. The prepolymer is cast over the sacrificial layer and cured according to the method described above. Water is used to dissolve the sacrificial layer and release the polymerized bio-rubber, which will have a relief pattern of the capillary networks that had been formed in the silicon wafer. In one embodiment, the channels in the bio-rubber are 7 μm across and 5 μm deep. One skilled in the art will realize, that while the size limit for the channels is dictated by the resolution of the microfabrication technique, biological applications may benefit from channel sizes on the order of 5 to 10's or 100's of microns or larger. The capillary networks may be closed by covering them with a flat sheet of bio-rubber and curing it. For example, a layer of uncrosslinked polymer may be used as a glue between the patterned layer and the flat layer. Polymerizing the "glue" will knit the two pieces together. Alternatively, the adhesive described below may be used to adhere the two pieces to one another. Further curing of the assembly will increase the cross-link density of the glue and form covalent bonds between the glue and the flat and patterned bio-rubber layers. In an alternative embodiment, an uncrosslinked flat bio-rubber film may be cured over a patterned film to cover the channels.

These shapes may be exploited to engineer a wider variety of tissues. For example, the polymer may be fabricated into a tube to facilitate nerve regeneration. The damaged nerve is fed into the end of the tube, which guides the migration of axons across the wound site. Alternatively, bio-rubber may be used to fabricate the tissue structures of liver. For example, it may be formed into a network of tubes that mimic a blood vessel and capillary network which may be connected to a nutrient supply to carry nutrients to the developing tissue. Cells may be recruited to the network of tubes in vivo, or it may be seeded with blood vessel cells. Around this network of tubes, bio-rubber may be formed into networks imitating the arrangements of extracellular matrix in liver tissue and seeded with hepatocytes. Similarly, the bio-rubber may be fabricated into a fibrous network, seeded with islet cells, and used to tissue engineer pancreas. The bio-rubber may also be seeded with a variety of other cells, for example, tenocytes, fibroblasts, ligament cells, endothelial cells, epithelial cells, muscle cells, nerve cells, kidney cells, bladder cells, intestinal cells, chondrocytes, bone-forming cells, stem cells such as human embryonic stem cells or mesenchymal stem cells, and others.

Medical Applications

Other medical applications may also benefit from the elasticity of the polymer of the invention. For example, after abdominal surgery, the intestines and other abdominal organs tend to adhere to one another and to the abdominal wall. It is thought that this adhesion results from post-surgical inflammation, however, anti-inflammatory drugs delivered directly to the abdominal region dissipate quickly. Bio-rubber may be used to deliver anti-inflammatory drugs to the abdominal region. Because bio-rubber is soft and flexible, it may be implanted between the abdominal wall and internal organs, for example, by attaching it to the abdominal wall, without cutting internal organs, which would lead to infection. The anti-inflammatory drug can be released from the bio-rubber over a period of months. While previous researchers have attempted to use hydrogels, hyaluronic acid-based membranes, and other materials to solve these problems, such materials tend to degrade quickly in the body; a longer resident period is necessary to prevent adhesion.

In another embodiment, bio-rubber may be used to coat a metallic stent. Because bio-rubber is flexible, it will expand with the stent without ripping, while the stiffness of the metal stent will prevent the bio-rubber from elastically assuming its previous shape. The bio-rubber may release heparin or other anti-coagulants or anti-inflammatory agents to prevent the formation of clots or scar tissue, which could close off the blood vessel or throw off a thrombus that could cause circulatory problems, including stroke, elsewhere in the body. Alternatively or in addition, angiogenic agents may be used to promote the remodeling of the blood vessel surrounding the stent. Indeed, any biomolecule, small molecule, or bioactive agent may be combined with the polymer. Such molecules may be covalently or non-covalently linked with the polymer.

Bio-rubber may also be used to prepare "long term" medical devices. Unlike typical permanent medical devices, bio-rubber will degrade over time. For example, the material may be fabricated into a biodegradable cardiac stent. Preferably, bio-rubber is combined with a harder polymer that plastically forms for the production of stents. Exemplary polymers include any of the polymers listed above, preferably biodegradable polymers. The bio-rubber acts as a plasticizer that enables the stent to expand into the desired shape after implantation. The stent increases the diameter of the blood vessel to allow easier circulation, but, because the stent is biodegradable, surrounding blood vessels increase in diameter without thrombosis or covering the stent with scar tissue, which would reclose the blood vessel. The time the stent should remain in place and retain its shape before degradation will vary from patient to patient and depend partially on the amount of blockage and the age of the patient (e.g., older patients require more time to heal). One skilled in the art will easily be able to adjust the molecular weight and cross-link density of the polymers in the stent to adjust the degradation rate. As for the coated stent, the degradable stent may release biomolecules, small molecules, bioactive agents, or some combination of these in situ.

The glycerol-diacid co-polymer may also be used as surgical glue. A biocompatible, biodegradable surgical glue may be used to stop bleeding during surgery but does not need to be removed before the surgeon sutures the wound closed and will degrade over time. Current surgical glues often use fibrin derived from bovine tissue, and a synthetic surgical glue reduces the risk of Creuzfeld-Jakob syndrome ("mad cow disease"). To produce the glue, the polymer should be held under vacuum for only 24 hours instead of 48, thus reducing the cross-link density, increasing the number of hydroxyl groups, and rendering the product exceedingly sticky. For example, after 24 hours under vacuum, the polymer will stick to supposedly non-stick materials such as polytetrafluoroethylene (PTFE). The stickiness may result from hydrogen bonding of the polymer with the adjacent material. While bio-rubber for tissue engineering applications typically has a cross-link density less than 10%, a glycerol-diacid co-polymer for use as a surgical glue has a cross-link density less than 1%, preferably less than 0.5%, and more preferably less than 0.05%.

Bio-rubber may also be used to support in vivo sensors and catheters. The polymer is constructed into a chamber for an optical fiber-based sensor or a coating for a catheter that is inserted into the area of interest. In a sensor, the chamber contains a specific chromophore-bonded receptor for the molecule of interest. When an analyte attaches to the receptor, the chromophore will either emit or absorb light at an specific wavelength. The absorption or emission may be detected by an apparatus connected to the optical fiber. The sensor may be used for short term, continuous monitoring, for example, for ten to fifteen days. Likewise, a catheter may be used to periodically deliver drugs or other small molecules or bioactive agents to a specific site or intravenously. Use of bio-rubber reduces the formation of scar tissue which would ordinarily form around a shunt or other implant that is used for more than two weeks. The degradation rate of the bio-rubber should be optimized so that there is not significant degradation of the material while it is in place in the patient.

Drug Release Applications

Bio-rubber may also be used for drug release applications, especially in applications where the matrix retaining the drug needs to be flexible. Because bio-rubber is elastic, it will move with the patient as he/she walks, runs, sits, etc. Because bio-rubber maintains its mechanical integrity as it degrades, the device is unlikely to fail catastrophically toward the end of its lifetime, reducing the risk of a bolus release of the desired agent. Biomolecules, small molecules, and bioactive agents may all be combined with bio-rubber using covalent or non-covalent interactions. Exemplary non-covalent interactions include hydrogen bonds, electrostatic interactions, hydrophobic interactions, and van der Waals interactions.

Bio-rubber may also be used for other wounds that are hard to close or that fail to heal properly through normal physiologic mechanisms. For example, diabetics often get skin injuries ("diabetic ulcers"), especially in the lower extremities, that take a long time to heal or fail to heal properly due to poor circulation. The use of bio-rubber to deliver antibiotics or anti-inflammatory agents to these wounds will aid healing and provide a cover for the wound.

Non-medical Applications

Bio-rubber may also be used for non-medical applications. For example, diapers are formed from a tough elastomer and liquid-permeable topsheet that encase an absorbent material. Currently, polypropylene is used for the elastomeric "casing". Polypropylene is not degradable and requires ten or more years to break down in a landfill. In contrast, bio-rubber is stable in a dry environment but will degrade in a landfill within two to four weeks after becoming wet. Similar products that can exploit the biodegradability of bio-rubber include incontinence protectors, sanitary napkins, panty liners, and wound dressings. Likewise, plastic bags, e.g., trash bags, may be made partially or entirely of the polymer of the invention. Where bio-rubber is used alone, it may be desirable to increase the cross-link density or modify the hydroxyl groups to increase the degradation time and prevent significant degradation before the bag reaches the landfill.

Bio-rubber may be exploited to protect not only natural resources but the animals that depend on those natural resources. For example, it is very popular to release helium filled balloons at various public events. The balloons eventually pop and drift back down to earth, where animals may choke while attempting to eat them. In contrast, balloons made out of bio-rubber would degrade upon exposure to the elements. Such balloons could eventually be digested by animals that eat them and would not present a continuing choking risk to animals once they degraded. In another embodiment, bio-rubber may be used to fabricate fishing lures or flies. When a fisherman loses a lure, the lure will simply sink to the bottom of the stream or lake and eventually degrade.

In another non-medical application, uncrosslinked glycerol-diacid co-polymers may be used as a base for chewing gum. For example, uncrosslinked material may be combined with a colorant, flavor enhancer, or other additive to produce a gum. The appropriate microstructure to produce a pleasant mouthfeel during chewing may be easily determined by polymerizing the polymer to different molecular weights and cross-link densities and chewing the resulting material for a few minutes.

The gum may also be adapted to deliver nutrients (e.g., vitamins) or drugs to the chewer. Nutrients may include FDA-recommended nutrients such as vitamins and minerals, amino acids, or various nutritional supplements available at health food stores. Such additives may simply be mixed with the glycerol-diacid co-polymer to produce a gum. Alternatively, they may be covalently attached to the polymer, preferably through hydrolyzable bonds or bonds that are lysed by the enzymes found in the mouth. As the gum is chewed, the nutrient or drug is released and swallowed. If the gum is swallowed, it will be completely metabolized in the digestive system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A biocompatible, biodegradable elastomeric crosslinked polymer comprising glycerol and a diacid, wherein the polymer has a cross-link density of 1% up to less than about 40%, which can be obtained by polycondensation and crosslinking of glycerol and diacid at 120° C. under an inert atmosphere with reduction in pressure for 24 to 48 hours until the desired crosslinking is reached.

2. The polymer of claim 1, wherein the ratio of the glycerol to the diacid is between 1 and 1.5.

3. The polymer of claim 1, wherein the diacid is sebacic acid.

4. The polymer of claim 1, wherein the diacid is selected from malonic acid, succinic acid, glutaric acid, adipic acid, pimelic acid, suberic acid, and azelaic acid.

5. The polymer of claim 1, wherein the diacid includes a carbon chain having greater than 10 carbon atoms.

6. The polymer of claim 5, wherein the diacid includes a carbon chain having greater than 15 carbon atoms.

7. The polymer of claim 6, wherein the diacid includes a carbon chain having greater than 20 carbon atoms.

8. The polymer of claim 7, wherein the diacid includes a carbon chain having greater than 25 carbon atoms.

9. The polymer of claim 1, wherein the diacid includes one or more double bonds, an aromatic group, an amine, a hydroxyl group, a halogen atom, an aliphatic side chain, or any combination of the above.

10. The polymer of claim 1, wherein the polymer has a cross-link density of less than 30%.

11. The polymer of claim 10, wherein the polymer has a cross-link density of less than 20%

12. The polymer of 11, wherein the polymer has a cross-link density of less than 10%.

13. The polymer of claim 12 wherein the polymer has a cross-link density of 5%.

14. The polymer of claim 1, wherein the Young's modulus of the polymer is less than 3 MPa.

15. The polymer of claim 14, wherein the Young's modulus of the polymer is less than 1 MPa.

16. The polymer of claim 15, wherein the Young's modulus of the polymer is less than 0.5 MPa.

17. The polymer of claim 16, wherein the polymer has a modulus less than 100 kPa.

18. The polymer of claim 7, wherein the polymer has a modulus less than 10 kPa.

19. The polymer of claim 1, wherein the ultimate tensile strength of the polymer is greater than 0.5 MPa.

20. The polymer of claim 1, wherein the polymer has a maximum elongation greater than 250%.

21. The polymer of claim 1, wherein, when the polymer is exposed to an aqueous environment, the polymer is characterized by surface erosion.

22. The polymer of claim 1, further comprising a biomolecule, a hydrophilic group, a hydrophobic group, a non-protein organic group, an acid, a small molecule, a bioactive molecule, or any combination of the above.

23. The polymer of claim 22, wherein the biomolecule is selected from the group consisting of growth factors, cell adhesion sequences, polynucleotides, polysaccharide, polypeptide, an extracellular matrix component, and any combination of the above.

24. The polymer of claim 22, wherein the biomolecule, a hydrophilic group, a hydrophobic group, a non-protein organic group, an acid, a small molecule, a bioactive molecule, or any combination of the above is linked to the polymer through a member of a covalent bond, a hydrogen bond, an electrostatic interaction, a hydrophobic interaction, and a van der Waals interaction.

25. The polymer of claim 1, wherein the polymer further comprises a second polymer as a mixture or adduct.

26. The polymer of claim 25, wherein the second polymer is biocompatible.

27. The polymer of claim 25, wherein the second polymer is biodegradable or non-biodegradable.

28. The polymer of claim 1, wherein a chromophore is covalently linked to the polymer.

29. The polymer of claim 28, wherein a receptor is covalently linked to the chromophore or interposed between the chromophore and the polymer.

30. The polymer of claim 1, wherein the polymer is adapted and constructed to be porous.

31. The polymer of claim 1, wherein the polymer further comprises a porogen mixed. into the polymer.

32. The polymer of claim 1, wherein the polymer has a shape selected from particles, tube, sphere, strand, coiled strand, capillary network, film, fiber, mesh, and sheet.

33. A stent, comprising the polymer of claim 1.

34. The stent of claim 33, further comprising a bioactive agent disposed within the polymer.

35. The stent of claim 34, wherein the bioactive agent is covalently or non-covalently linked to the polymer.

36. A stent, comprising:
the polymer of claim 1, and
a second polymer
wherein the two polymers are combined in a mixture or adduct.

37. The stent of claim 36, wherein the second polymer is biodegradable or non-biodegradable.

38. The stent of claim 36, further comprising a bioactive agent.

39. The stent of claim 38, wherein the bioactive agent is covalently or non-covalently linked to the polymer, the second polymer, or both.

40. A method of producing a polymer, comprising:
combining glycerol and a diacid to form a mixture; holding the mixture under conditions equivalent to a temperature of 120° C. in an inert atmosphere at a pressure of 1 Torr to 40 mTorr until the mixture forms a crosslinked polymer having a pre-determined crosslinking density of 1% up to less than about 40%.

41. The method of claim 40, wherein the mixture is held at a pressure of 40 mTorr for 24 hours.

42. The method of claim 40, wherein the mixture is held at a pressure of 40 mTorr for 48 hours.

43. The method of claim 40, wherein the step of combining further comprises adding a porogen to the mixture.

44. The method of claim 43, wherein the porogen is selected from the group consisting of azodicarboimide, an alkali halide salt, and a water-soluble salt.

45. The method of claim 44, further comprising soaking the polymerized mixture in water to leach out the porogen.

46. The method of claim 40, further comprising modifying hydroxyl groups on the polymer with a member selected from the group consisting of a biomolecule, a hydrophilic group, a hydrophobic group, a non-protein organic group, an acid, a small molecule, a bioactive agent, and any combination of the above.

47. The method of claim 40, further comprising:
providing a substrate having a predetermined pattern of grooves and channels and a sacrificial coating of a water-soluble material;
after the step of combining, casting the mixture over the substrate; and
after the mixture has the predetermined cross-link density, dissolving the sacrificial layer to free the polymer from the substrate,
wherein the polymer has a relief pattern corresponding to the predetermined pattern.

48. The method of claim 47, further comprising covering the relief pattern in the polymer to form covered channels.

49. The method of claim 48, wherein the cover comprises an elastomeric co-polymer of glycerol and a diacid.

50. The method of claim 47, wherein the step of covering comprises providing a cover, disposing a partially polymerized equimolar mixture of glycerol and a diacid between the cover and the polymer, and cross-linking the equimolar mixture.

51. The method of claim 47, comprising
combining glycerol and a diacid to form a mixture;
holding the mixture at a temperature of 120° C. in an inert atmosphere at a pressure of 1 Torr for 24 hours; and
holding the mixture at a temperature of 120° C. in an inert atmosphere at a pressure of 1 Torr until the polymer has a predetermined cross-link density.

52. The polymer of claim 1, wherein the Young's modulus of the polymer is less than 5 MPa.

53. The polymer of claim 1, further comprising reducing the pressure from 1 Torr to 40 mTorr over 5 hours.

54. The polymer of claim 1, further comprising curing the polymer at 120° C. at 40 mTorr for 24-48 hours.

\* \* \* \* \*

UNITED STATES PATENT AND TRADEMARK OFFICE
CERTIFICATE OF CORRECTION

Page 1 of 1

PATENT NO. : 7,722,894 B2
APPLICATION NO. : 10/277562
DATED : May 25, 2010
INVENTOR(S) : Yadong Wang, Guillermo Ameer and Robert Langer It is certified that error appears in the above-identified patent and that said Letters Patent is hereby corrected as shown below:

Specification, column 1, lines 12-15, replace "The work described herein was supported, in part, by a grant from the National Institutes of Health (#5-R01-HL60435-02). Accordingly, the Government may have certain rights in this invention." with --This Invention was made with government support under grant number R01 HL060435 awarded by the National Institutes of Health. The government has certain rights in this invention.--.
Claim 1, column 23, line 56, replace "120° C." with --120° C--.
Claim 11, column 24, line 14, replace "20%" with --20%.--.
Claim 18, column 24, line 27, replace "7" with --17--.
Claim 31, column 24, line 67, replace "mixed." with --mixed--.
Claim 40, column 25, line 24, replace "120° C." with --120° C--.
Claim 51, column 26, lines 27 and 29, replace "120° C." with --120° C--.
Claim 54, column 26, line 38, replace "120° C." with --120° C--.

Signed and Sealed this
Fourth Day of October, 2011

David J. Kappos
*Director of the United States Patent and Trademark Office*